US011989361B1

(12) United States Patent
Vlasov

(10) Patent No.: US 11,989,361 B1
(45) Date of Patent: May 21, 2024

(54) CONTEXTUAL BRAKING FOR AN INPUT DEVICE

(71) Applicant: Logitech Europe S.A., Lausanne (CH)

(72) Inventor: Maxim Vlasov, Geneva (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/183,848

(22) Filed: Mar. 14, 2023

(51) Int. Cl.
*G06F 3/0362* (2013.01)
*G06F 3/0354* (2013.01)
*G06F 3/0485* (2022.01)

(52) U.S. Cl.
CPC ........ *G06F 3/0362* (2013.01); *G06F 3/03543* (2013.01); *G06F 3/0485* (2013.01); *G06F 2203/04806* (2013.01)

(58) Field of Classification Search
CPC .................................................... G06F 3/0362
See application file for complete search history.

(56) References Cited

U.S. PATENT DOCUMENTS

| | | | | |
|---|---|---|---|---|
| 11,128,636 B1 * | 9/2021 | Jorasch | ................. | G07C 9/257 |
| 2005/0179661 A1 * | 8/2005 | Bohn | ................. | G06F 3/03543 |
| | | | | 345/163 |
| 2009/0033640 A1 * | 2/2009 | Hsu | ....................... | G06F 3/0362 |
| | | | | 345/184 |
| 2009/0102817 A1 * | 4/2009 | Bathiche | ............. | G06F 3/03543 |
| | | | | 345/184 |
| 2014/0333536 A1 * | 11/2014 | Tee | ....................... | G06F 3/0362 |
| | | | | 345/163 |
| 2020/0004352 A1 * | 1/2020 | McLoughlin | ........... | G06F 3/038 |
| 2020/0103972 A1 * | 4/2020 | Amin-Shahidi | ...... | G06F 3/0346 |
| 2021/0318761 A1 * | 10/2021 | Dunant | ................... | G06F 3/038 |
| 2021/0342020 A1 * | 11/2021 | Jorasch | .................... | H04L 67/12 |
| 2022/0155879 A1 * | 5/2022 | Rizvi | .................... | G06F 3/0312 |
| 2022/0412416 A1 * | 12/2022 | Battlogg | ................... | F16F 9/12 |

* cited by examiner

*Primary Examiner* — Chun-Nan Lin
(74) *Attorney, Agent, or Firm* — Kilpatrick Townsend & Stockton LLP

(57) ABSTRACT

A computer mouse comprising a scroll wheel, a braking system operable to provide a braking force on the scroll wheel, and a sensor system operable to detect a force or motion of the scroll wheel in the first and second directions. In response to receiving a control signal to stop rotation of the scroll wheel in the first direction, the braking system applies the braking force on the scroll wheel when the sensor indicates that the force or motion of the scroll wheel is in the first direction and removes the braking force when the sensor indicates that the force or motion of the scroll wheel is in the second direction.

22 Claims, 12 Drawing Sheets

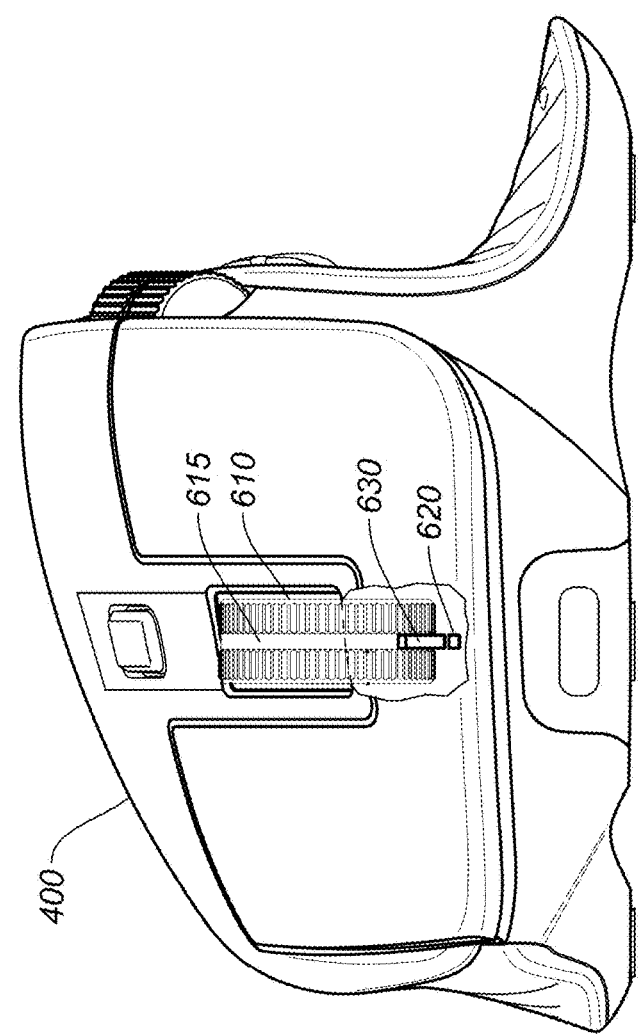
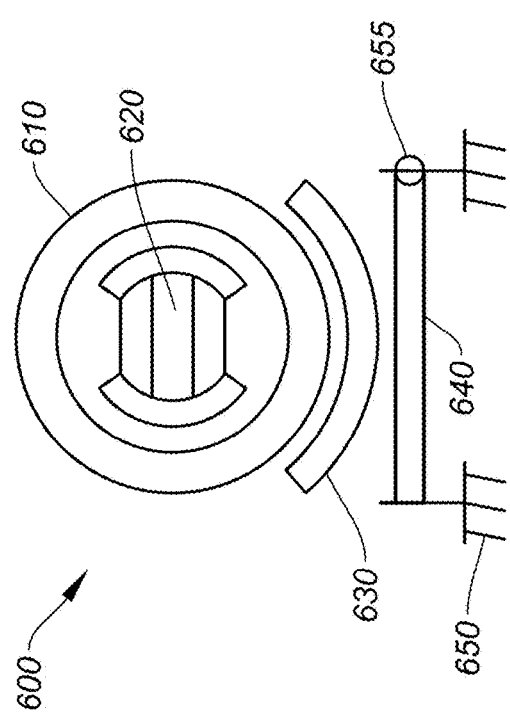
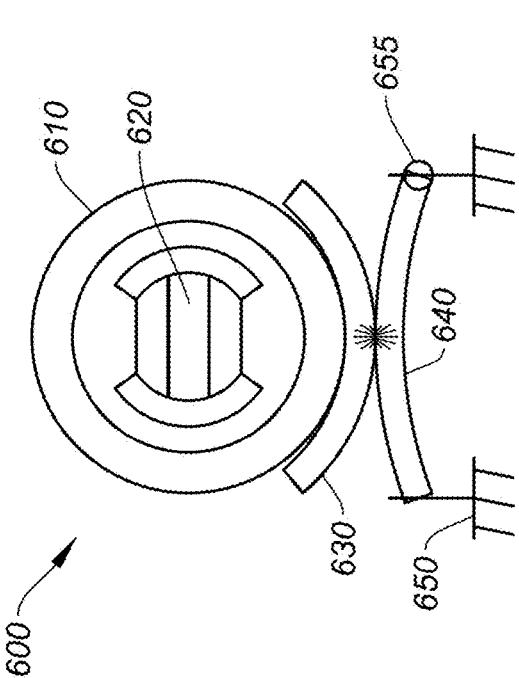
FIG. 6A
FIG. 6B
FIG. 6C

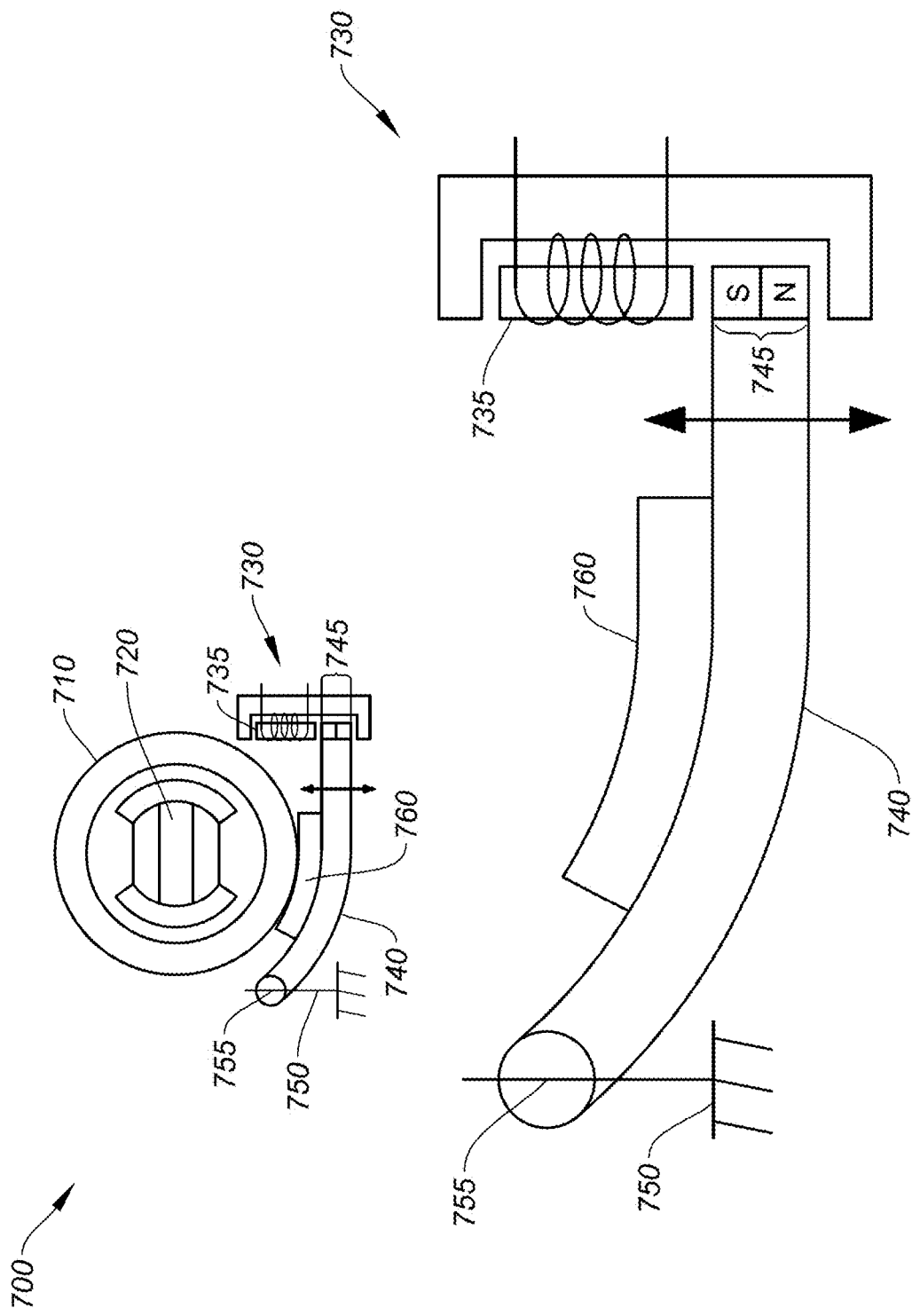

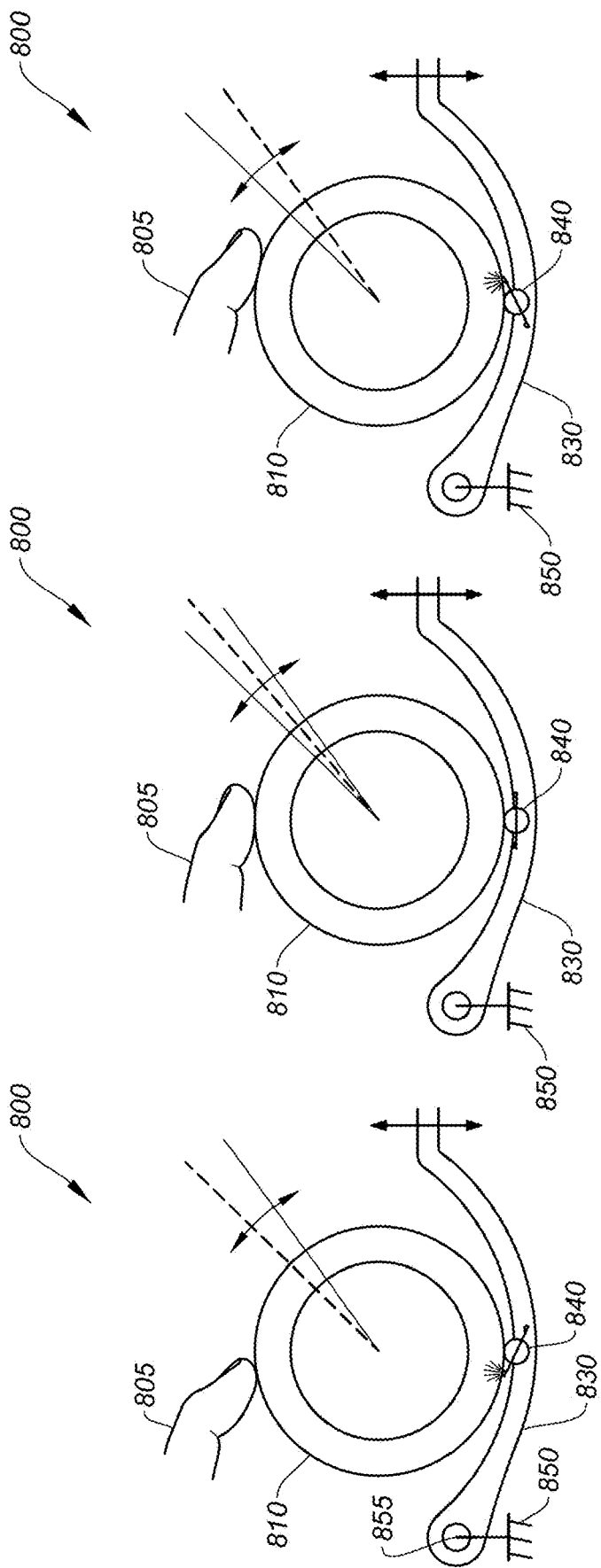

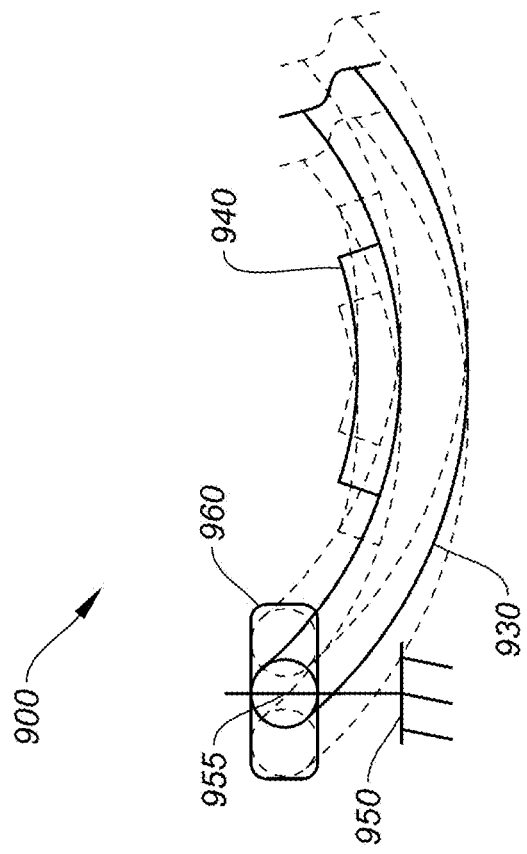
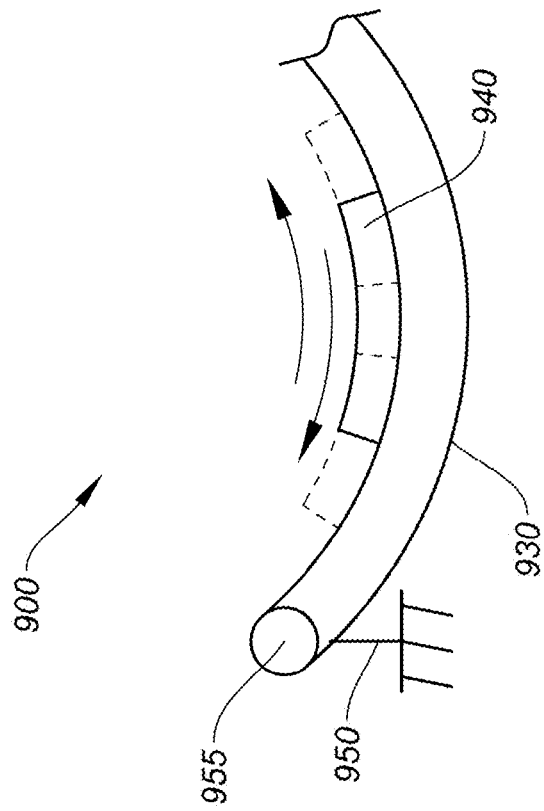
FIG. 9B
FIG. 9A

CONTEXTUAL BRAKING FOR AN INPUT DEVICE

BACKGROUND

The computer mouse has been long established as a quintessential tool for facilitating efficient interfacing between human and modern personal computing devices. Computer mice have undergone significant improvements over the course of the last several decades. Some computer mice are designed for high performance gaming with high communication rates, high accuracy and precision with movement sensing (e.g., optical sensor(s)) and input detection (e.g., buttons, scroll wheels), and light weight. Some are designed for productivity and may include multiple programmable buttons that can be accessible by a thumb or multiple fingers, added functionality such as switching between multiple host computing devices, and other useful features. Some improvements relate to better ergonomics (e.g., surface contouring, improved button response), tracking accuracy (e.g., higher dots-per-inch (DPI) settings, tracking on glass, etc.), faster communication (e.g., with a communicatively coupled host computing device), improved robustness and longevity, and changing a feedback profile on a scroll wheel, including profiles such as freewheel, ratcheting, linear, and constant force feedback.

Despite the many advancements in functionality and user experience in computer mice, more improvements are needed to support more dynamic and real-time control options for a better interactive user experience.

BRIEF SUMMARY

A computer mouse comprises: one or more processors; a scroll wheel operable to rotate on an axis in a first and second direction; a braking system controlled by the one or more processors and operable to provide a braking force on the scroll wheel that stops and prevents rotation of the scroll wheel; and a sensor system operable to detect a force or motion of the scroll wheel in the first and second directions, wherein in response to receiving a control signal to stop rotation of the scroll wheel in the first direction, the one or more processors cause the braking system to: apply the braking force on the scroll wheel when the sensor indicates that the force or motion of the scroll wheel is in the first direction; and remove the braking force when the sensor indicates that the force or motion of the scroll wheel is in the second direction, wherein in response to receiving a control signal to stop rotation of the scroll wheel in the second direction, the one or more processors cause the braking system to: apply the braking force on the scroll wheel when the sensor indicates that the force or motion of the scroll wheel is in the second direction; and remove the braking force when the sensor indicates that the force or motion of the scroll wheel is in the first direction. In some embodiments, the computer mouse further comprises a feedback profile system configured to cause the scroll wheel to rotate according to a plurality of modes of operation including at least two of: a ratcheting rotational feedback; a constant force rotational feedback; a linear resistance rotational feedback; and a freewheel rotational feedback, wherein the feedback profile system is a different system than the braking system. In some aspects, the feedback profile system is an electro-permanent magnet (EPM)-based system.

In some embodiments, the braking system may include: an engagement mechanism; and a piezoelectric device controlled by the one or more processors and coupled to the engagement mechanism, wherein in response to an applied voltage, the piezoelectric device bends and pushes the engagement mechanism from a first position, where the engagement mechanism does not interface with the scroll wheel, to a second position where the engagement mechanism interfaces with the scroll wheel and provides the braking force. In some cases, the piezoelectric device and the engagement mechanism are configured on an axis of the scroll wheel, where the engagement mechanism coaxially interfaces with the scroll wheel when in the second position. The engagement mechanism may include one or more radial protrusions that provide the braking force, and the engagement mechanism can allow a limited rotation of the scroll wheel before the radial protrusion provides the braking force. The limited rotation can enable the sensor system to detect the force or motion of the scroll wheel in the first and second directions.

In some embodiments, the computer mouse further comprises a chassis, and the engagement mechanism comprises: a cantilevered arm fixedly and rotatably coupled to the chassis, the cantilevered arm positioned radially adjacent along a portion of a user-actuated outer portion of the scroll wheel; and a braking element coupled to the cantilevered arm and configured to interface with the outer portion of the scroll wheel and provide the braking force when the engagement mechanism is in the second position, where the braking element allows a limited movement of the scroll wheel before it applies the braking force, and where the limited movement enables the sensor system to detect the force or motion of the scroll wheel in the first and second directions. In some cases, the braking element has a round portion with at least one radially protruding wing, where the round portion of the braking element interfaces with outer portion of the scroll wheel, where the round portion allows the limited movement as a rotation of the braking element when the engagement mechanism is in the second position and the radially protruding wing is not in contact with the outer portion of the scroll wheel, and where braking element provides the braking force when the radially protruding wings is in contact with the outer portion of the scroll wheel.

In further embodiments, the braking element is a brake shoe coupled to the cantilevered arm and configured to interface with the outer portion of the scroll wheel when the engagement mechanism is in the second position, where the brake shoe allows a limited translational movement between the brake shoe and the cantilevered arm when the engagement mechanism is in the second position before applying the braking force. In some implementations, the braking element is a brake shoe coupled to the cantilevered arm and configured to interface with the outer portion of the scroll wheel when the engagement mechanism is in the second position, where the cantilevered arm is fixedly and rotatably coupled to the chassis at a coupling point in a manner that allows a limited translational movement between the cantilevered arm and the chassis at the coupling point before the brake shoe applies the braking force.

In some embodiments, the computer mouse further comprises a chassis, and wherein the engagement mechanism comprises: a cantilevered arm fixedly and rotatably coupled to the chassis, the cantilevered arm positioned radially adjacent along a portion of a user-actuated outer portion of the scroll wheel; a braking element coupled to the cantilevered arm and configured to interface with the outer portion of the scroll wheel and provide the braking force when the engagement mechanism is in the second position, wherein the sensor system further comprises a force or strain sensor configured between the cantilevered arm and the braking element and operable to detect the force or motion of the scroll wheel in the first and second directions.

In certain embodiments, the braking system includes: an engagement mechanism; and an EPM-based system controlled by the one or more processors via a controller current, the EPM-based system coupled to the engagement mechanism, where in response to a controller current, the EPM-based system magnetically moves the engagement mechanism from a first position where the engagement mechanism does not interface with the scroll wheel to a second position where the engagement mechanism interfaces with the scroll wheel and provides the braking force. In some cases, the computer mouse further comprises a chassis, and where the engagement mechanism comprises: a cantilevered arm fixedly and rotatably coupled to the chassis, the cantilevered arm positioned radially adjacent along a portion of a user-actuated outer portion of the scroll wheel; and a braking element coupled to the cantilevered arm and configured to interface with the outer portion of the scroll wheel and provide the braking force when the engagement mechanism is in the second position, where the braking element allows a limited movement of the scroll wheel before it applies the braking force, and where the limited movement enables the sensor system to detect the force or motion of the scroll wheel in the first and second directions.

In certain embodiments, the braking element has a round portion with at least one radially protruding wing, where the round portion of the braking element interfaces with outer portion of the scroll wheel, where the round portion allows the limited movement as a rotation of the braking element when the engagement mechanism is in the second position and the radially protruding wing is not in contact with the outer portion of the scroll wheel, and where braking element provides the braking force when the radially protruding wings contacts the outer portion of the scroll wheel. In some aspects, the braking element can be a brake shoe coupled to the cantilevered arm and configured to interface with the outer portion of the scroll wheel when the engagement mechanism is in the second position, the brake shoe allows a limited translational movement between the brake shoe and the cantilevered arm when the engagement mechanism is in the second position before applying the braking force.

In some embodiments, the control signal is received from a host computing device and is associated with an interaction by the computer mouse with a software application operating on the host computing device, the control signal corresponding to at least one of: a scrolling action in the software application, via the scroll wheel, that reaches a beginning or end of a selectable list of elements, settings, or options; a zooming action in the software application, via the scroll wheel, that reaches a lower or upper limit of a zoom range; a shuttling action in the software application, via the scroll wheel, that reaches a beginning or end of an audio file, a video file, a series of images; and a switching action in the software application, via the scroll wheel, that reaches a beginning or end of a series of selectable objects.

In further embodiments, a method of operating a computer mouse includes: receiving, by one or more processors, a control signal requesting that a braking system stop and prevent a rotation of a scroll wheel in a first direction, the scroll wheel normally operable to rotate in the first direction and a second direction; sensing, by a sensor system, a force or motion of the scroll of the scroll wheel in either the first or second direction; when the sensor indicates that a force or motion of the scroll wheel is in the first direction: applying the braking force on the scroll wheel; and removing the braking force when the sensor indicates that the force or motion of the scroll wheel is in the second direction. The method can further include a feedback profile system configured to cause the scroll wheel to rotate according to a plurality of modes of operation including at least two of: a ratcheting rotational feedback; a constant force rotational feedback; a linear resistance rotational feedback; and a freewheel rotational feedback, where the feedback profile system is a different system than the braking system. In some cases, the braking system includes: an engagement mechanism; and a piezoelectric device controlled by the one or more processors and coupled to the engagement mechanism, wherein the method further comprises: applying a voltage to the piezoelectric device causing it to bend and thereby push the engagement mechanism from a first position, wherein the engagement mechanism does not interface with the scroll wheel, to a second position, wherein the engagement mechanism interfaces with the scroll wheel and provides the braking force. In some aspects, the piezoelectric device and the engagement mechanism are configured on an axis of the scroll wheel, where the engagement mechanism coaxially interfaces with the scroll wheel when in the second position.

In certain aspects, the engagement mechanism includes one or more radial protrusions that provide the braking force, the engagement mechanism allows a limited rotation of the scroll wheel before the radial protrusion provides the braking force, and the limited rotation enables the sensor system to detect the force or motion of the scroll wheel in the first and second directions. In some embodiments, the computer mouse further comprises a chassis, where the engagement mechanism comprises: a cantilevered arm fixedly and rotatably coupled to the chassis, the cantilevered arm positioned radially adjacent along a portion of a user-actuated outer portion of the scroll wheel; and a braking element coupled to the cantilevered arm and configured to interface with the outer portion of the scroll wheel and provide the braking force when the engagement mechanism is in the second position, where the braking element allows a limited movement of the scroll wheel before it applies the braking force, and wherein the limited movement enables the sensor system to detect the force or motion of the scroll wheel in the first and second directions. In some cases, the braking element can have a round portion with at least one radially protruding wing, where the round portion of the braking element interfaces with outer portion of the scroll wheel, where the round portion allows the limited movement of the braking element as a rotation when the engagement mechanism is in the second position and the radially protruding wing is not in contact with the outer portion of the scroll wheel, and where braking element provides the braking force when the radially protruding wings is in contact the outer portion of the scroll wheel.

In some cases, the braking element is a brake shoe coupled to the cantilevered arm and configured to interface with the outer portion of the scroll wheel when the engagement mechanism is in the second position, where the brake shoe allows a limited translational movement between the brake shoe and the cantilevered arm when the engagement mechanism is in the second position before applying the braking force. In some embodiments, the braking element can be a brake shoe coupled to the cantilevered arm and configured to interface with the outer portion of the scroll wheel when the engagement mechanism is in the second position, where the cantilevered arm is fixedly and rotatably coupled to the chassis at a coupling point in a manner that allows a limited translational movement between the cantilevered arm and the chassis at the coupling point before the brake shoe applies the braking force. In certain embodiments, the control signal is received from a host computing device and is associated with an interaction by the computer mouse with a software application operating on the host computing device, the control signal corresponding to at least one of: a scrolling action in the software application, via the scroll wheel, that reaches a beginning or end of a selectable list of elements, settings, or options; a zooming action in the software application, via the scroll wheel, that reaches a lower or upper limit of a zoom range; a shuttling action in the software application, via the scroll wheel, that reaches a beginning or end of an audio file, a video file, a series of images; and a switching action in the software application, via the scroll wheel, that reaches a beginning or end of a series of selectable objects.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIGS. 6A-6C show a system for applying contextual braking using a piezoelectric device, according to certain embodiments;

FIG. 7 shows an EPM-controlled braking system, according to certain embodiments;

FIGS. 8A-8C show a smart braking system for applying directional braking using motion detection via an engagement mechanism, according to certain embodiments;

FIGS. 9A-9B show additional types of engagement mechanisms, according to certain embodiments;

Throughout the drawings, it should be noted that like reference numbers are typically used to depict the same or similar elements, features, and structures.

DETAILED DESCRIPTION

Figure 1:
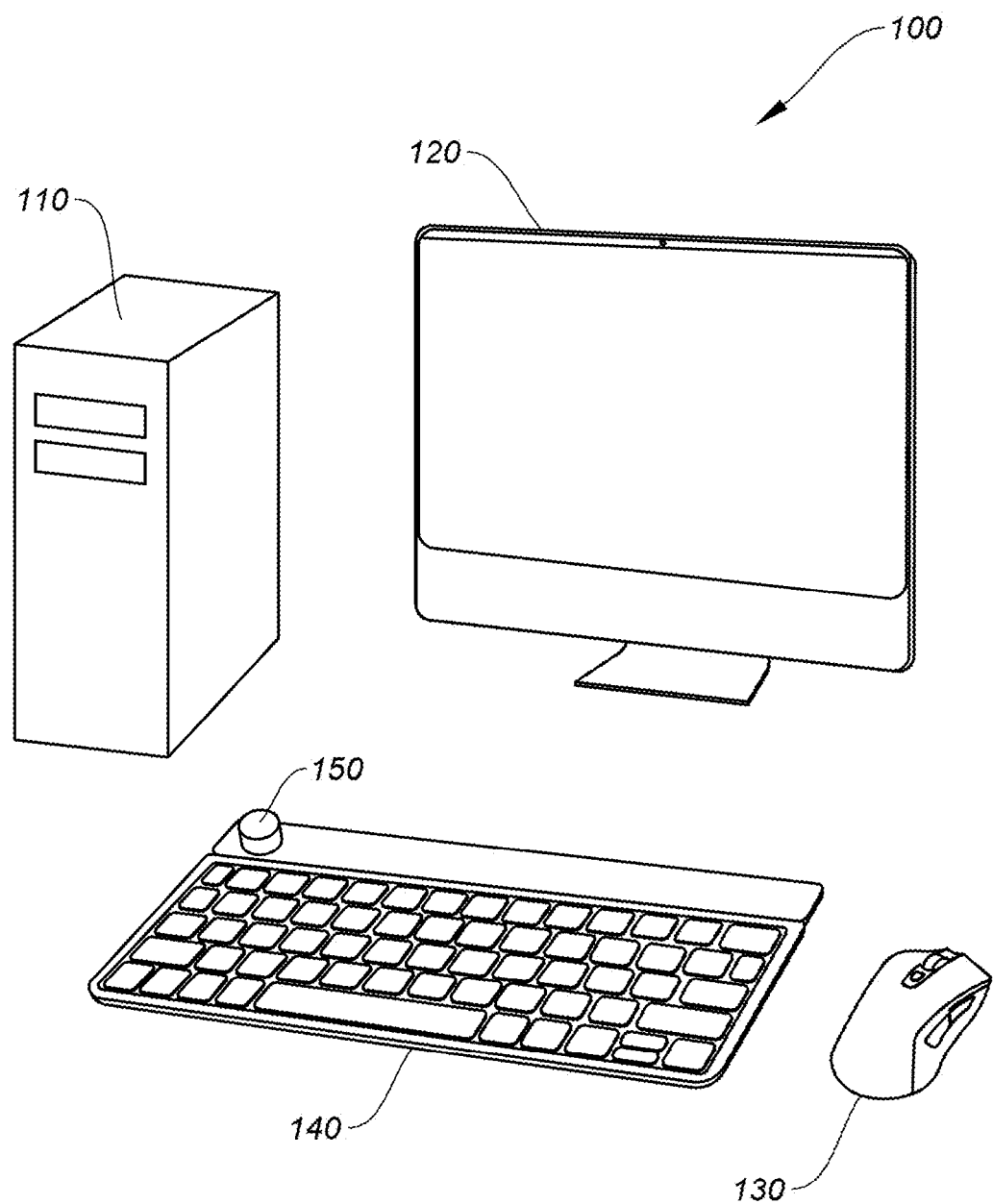
FIG. 1 shows a simplified example of a computer system that can include any of a variety of host computing devices and computer peripheral devices, including computer peripheral devices that can be configured to perform aspects of the various inventive concepts described herein.

Aspects of the present disclosure relate generally to computer peripheral devices, and more particularly to input element control systems for a computer mouse, according to certain embodiments.

In the following description, various examples of computer peripheral devices (e.g., computer mice) are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

The following high-level summary is intended to provide a basic understanding of some of the novel innovations depicted in the figures and presented in the corresponding descriptions provided below. Aspects of the invention relate to a dynamic and contextual braking system configured to stop and prevent rotation of a scroll wheel under certain circumstances. Any implementation of a contextual braking application can be supported. For example, a scroll wheel may be configured in a free-wheel mode where it can freely spin with very little resistance. Aspects of the invention may cause a contextual braking system to apply a braking action when a particular word (e.g., mobile) is depicted on the screen, such that a user can freely scroll through a document with peace of mind that the computer mouse will automatically halt a scrolling action at each instance the particular word, phrase, symbol, or any other sequence of text appears, and may further provide contextual braking in response to non-textual data such as video graphics, audio cues, or the like, that may occur. In another example, a list of selectable settings in a drop-down menu may have twenty selectable options. In some aspects, a computer mouse may operate the scroll wheel in a ratcheted mode of operation where a ratchet effect occurs as the user scrolls through each choice. The computer mouse may then apply a brake to stop movement of the scroll wheel when the user tries to scroll down beyond the twentieth selectable option and again when the user tries to scroll up past the first selectable option. In each example, rotation of the scroll wheel is allowed in one direction, but not the other. In some conventional systems, a braking system may be applied, but only universally and not in one direction. For instance, a conventional system may apply a braking action that prevents the user from rotating the scroll wheel in any direction, forward or backwards. Aspects of the invention can accommodate directional braking so that user can rotate in one direction but not the other, which can add more dimensions to its application. This functionality is made possible by a sensor system configured to momentarily detect a direction a user starts rotating the scroll wheel and subsequently apply the braking action if appropriate. Typically, the braking action is performed by a braking system that operates separately from the scroll wheel's force feedback system. For instance, a first system may be configured to provide a freewheel, ratchet, or resistance mode of operation for the scroll wheel as a rotational feedback for the user, which can be implemented with any suitable technology (e.g., electro-permanent magnet, electro-magnet, mechanical, or the like), and a second system may apply the braking action to stop the scroll wheel from rotating in a dynamic and contextual manner. However, some implementations may integrate both systems.

The various embodiments described below and depicted in the accompanying FIGS. provide a number of non-limiting implementations for braking systems that incorporate piezoelectric and/or EPM-based technology, however other system types are contemplated, as further described below. To provide a cursory preview of the description that follows, FIG. 6 shows an example of a piezoelectric-based braking system that utilizes a piezoelectric device that bends in response to a voltage and thereby pushes a brake shoe against the scroll wheel to impart a stopping force. FIG. 7 shows an EPM-based system that uses a magnetic field to move a cantilevered arm with a brake shoe to impart a stopping force on the scroll wheel. FIGS. 8-9 shows examples of an EPM-based system with different examples of engagement mechanisms that provide a limited movement or "free play" before a braking force is applied to allow the system to sense what direction the user is attempting to rotate the scroll wheel. This movement sensing facilitates the application of the dynamic and real-time contextual braking force. Some figures present various methods of implementing contextual braking and contemplate non-piezo-based solutions (e.g., FSR-based sensing) and more.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 shows a simplified example of a computer system 100 that can include any of a variety of host computing devices and computer peripheral devices, including computer peripheral devices (e.g., a computer mouse) that can be configured to perform aspects of the various inventive concepts described herein. Computer system 100 can include computer 110, monitor 120, input device 130, and keyboard 140. In some embodiments, input device 130 can be a computer mouse, a remote-control device, a game controller (e.g., game pad, joystick, flight stick, etc.) or elements thereof (e.g., hat switch), a media controller device, or other suitable device that can be used to convert analog inputs into digital signals for computer processing. In some cases, keyboard 140 can be a "qwerty" style keyboard, or any suitable input device (e.g., internet-of-things device, AR/VR controller, or the like). For computer system 100, input device 130 and keyboard 140 can be configured to control various aspects of computer 110 and monitor 120, as would be appreciated by one of ordinary skill in the art with the benefit of this disclosure. Monitor 120, input device 130, and keyboard 140 may be referred to as "computer peripheral devices." Computer peripheral devices 120-140 can be communicatively coupled to host computing device 110. The present disclosure provides inventive embodiments of input device 300 in a form factor of a computer mouse, but those of ordinary skill in the art would understand that the contextual braking concepts described herein could be adapted to any rotating input element (e.g., scroll wheel, knob, wheel, roller, etc.).

Computer 110 can be any suitable computing device including, but not limited to, a desktop computer, a laptop computer, a tablet or "phablet" computer, a smart phone, a PDA, a wearable device (e.g., smart watches, smart glasses), virtual reality/augmented reality (AR/VR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor 302 of FIG. 3) to control aspects of the host computing device, for instance, via the one or more computer peripheral devices.

Figure 2:
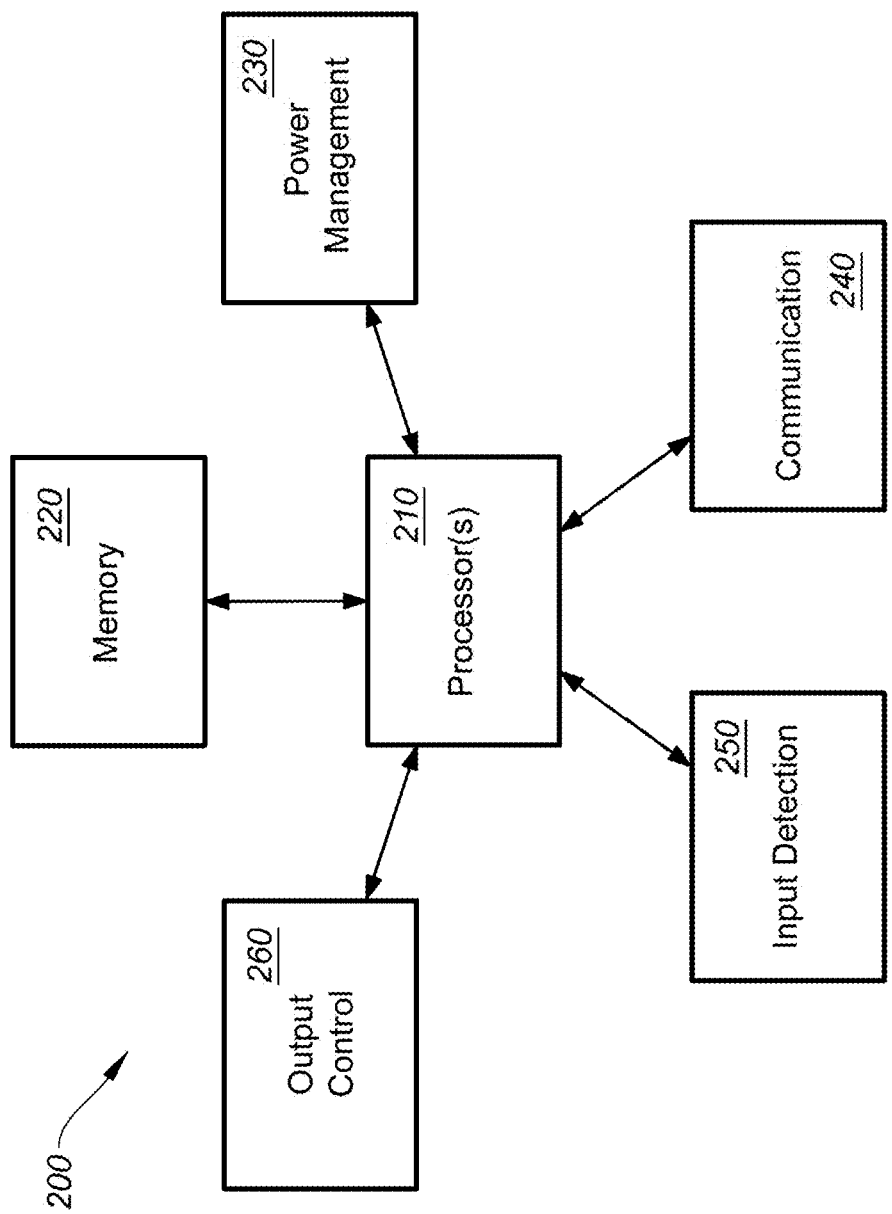
FIG. 2 shows a system for operating a computer peripheral, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices shown or not shown herein but within the wide purview of the present disclosure. System 200 may include processor(s) 210, memory 220, power management system 230, communication module 240, input detection system 250, and output control system 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 may be implemented as separate blocks, or alternatively, more than one system block may be implemented in a single block. In the context described herein, system 200 can be incorporated into any computer peripheral devices (e.g., computer mouse 130, input devices generally, or the like) described or mentioned herein, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer mouse 130 (e.g., system blocks 220-260). Alternatively or additionally, some of system blocks 220-260 may include additional dedicated processor(s), which may work in conjunction with processor(s) 210. For instance, MCUs, μCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor 210 to perform some or all of the various methods and/or control some or all of the various contextual braking systems described throughout this disclosure. In some embodiments, multiple processors may increase performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the computer peripheral device, such as a detected movement of the computer peripheral device, a sensor (e.g., optical sensor, accelerometer, movement sensors as described, e.g., with respect to FIGS. 8-10), activation of one or more input elements (e.g., key structures, buttons, sliders, touch-sensitive regions, contextual braking of said input elements, etc.), or the like. In some aspects, stored data may be aggregated and sent via reports to a host computing device.

In certain embodiments, memory 220 can store the various data described throughout this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute various operations as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications system 240, etc.). In certain embodiments, the functions provided by power management system 230 may be incorporated into processor(s) 210. Alternatively, some embodiments may not include a dedicated power management system. For example, functional aspects of power management system 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection system 250, output control system 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection system 250 can control the detection of a user-interaction with input elements on an input device. For instance, input detection system 250 can detect user inputs from motion sensors, keys (e.g., smart key structures, conventional keys), or buttons (e.g., depressible elements), roller wheels, scroll wheels (e.g., rotation of a scroll wheel in a first (e.g., forward) and second (e.g., backward) direction, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), force sensing (e.g., detecting force on a scroll wheel to rotate in a first or second direction via a force sensitive element such as an FSR, piezo device, etc.), audio based detection such as voice input (e.g., via microphone), or the like, as would be appreciated by one of ordinary skill in the art with the benefit of this disclosure. Alternatively, the functions of input detection system 250 or subset thereof can be subsumed by processor 210, or in combination therewith.

In some embodiments, input detection system 250 can detect a touch or touch gesture on one or more touch sensitive surfaces on computer mouse 130. Input detection system 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection system 250 can include touch and/or proximity sensing capabilities. Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection system 250 may include a movement tracking sub-block that can be configured to detect a relative displacement (movement tracking) of a computer peripheral device. For example, input detection system 250 optical sensor(s) such as IR LEDs and an imaging array of photodiodes to detect a movement of a computer peripheral device relative to an underlying surface. A computer peripheral device may optionally include movement tracking hardware that utilizes coherent (laser) light. Moving tracking can provide positional data (e.g., delta X and delta Y data from last sampling) or lift detection data. For example, an optical sensor can detect when a user lifts the computer peripheral device (e.g., computer mouse 130) off of an underlying surface (also referred to as a "work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or another device). Accelerometers can further determine if the computer peripheral device has been lifted off an underlying surface and can provide movement data that may include the velocity, physical orientation, and acceleration of a computer peripheral device. In some embodiments, gyroscope(s) can be used in lieu of or in conjunction with accelerometer(s) to determine movement or input device orientation.

In some embodiments, output control system 260 can control various outputs for a corresponding computer peripheral device. For instance, output control system 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular systems, it is to be understood that these systems are defined for convenience of description and are not intended to imply a particular physical arrangement of component parts. Further, the systems need not correspond to physically distinct components. Systems can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection system 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
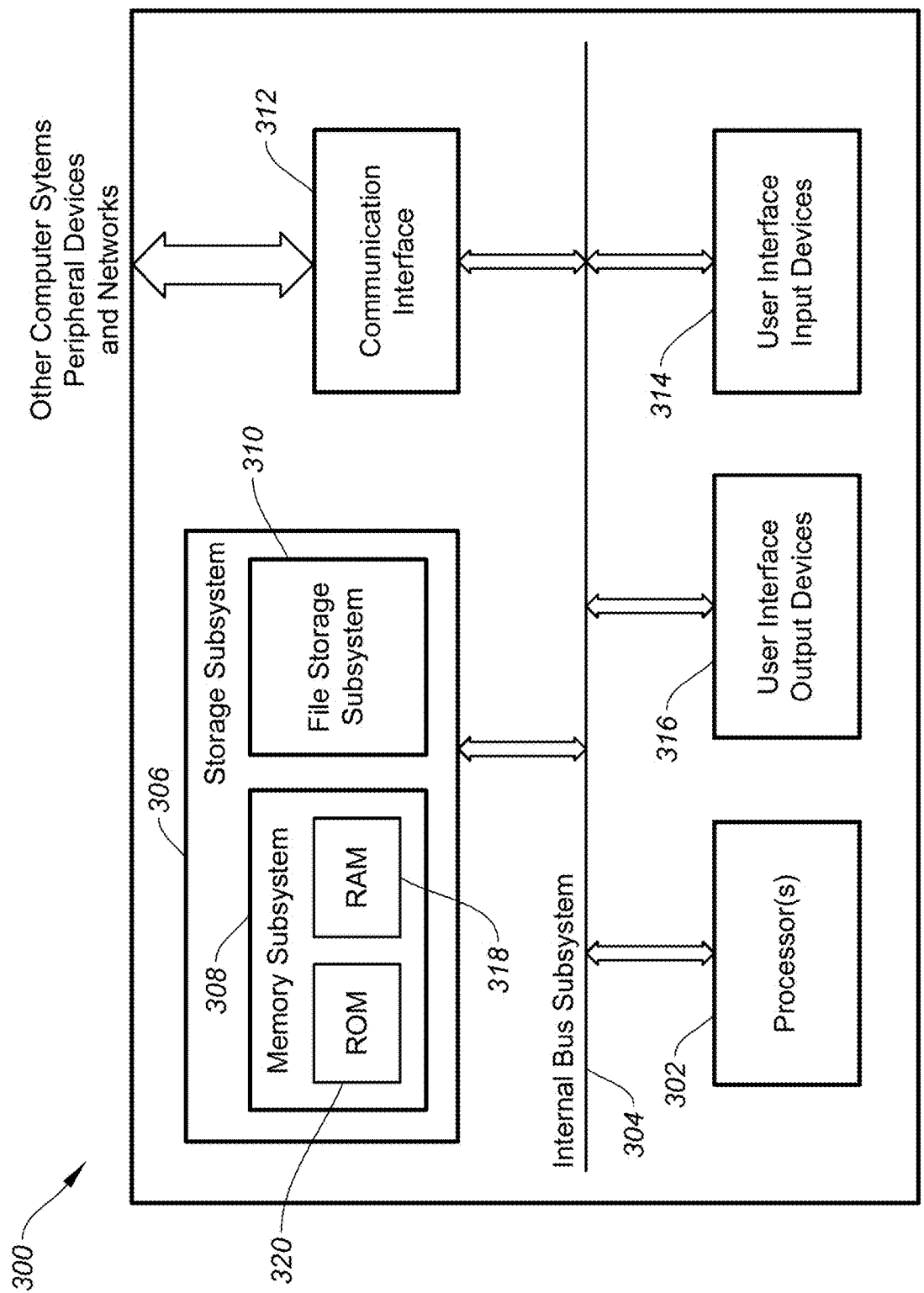
FIG. 3 is a simplified block diagram of a host computing device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Figure 4B:
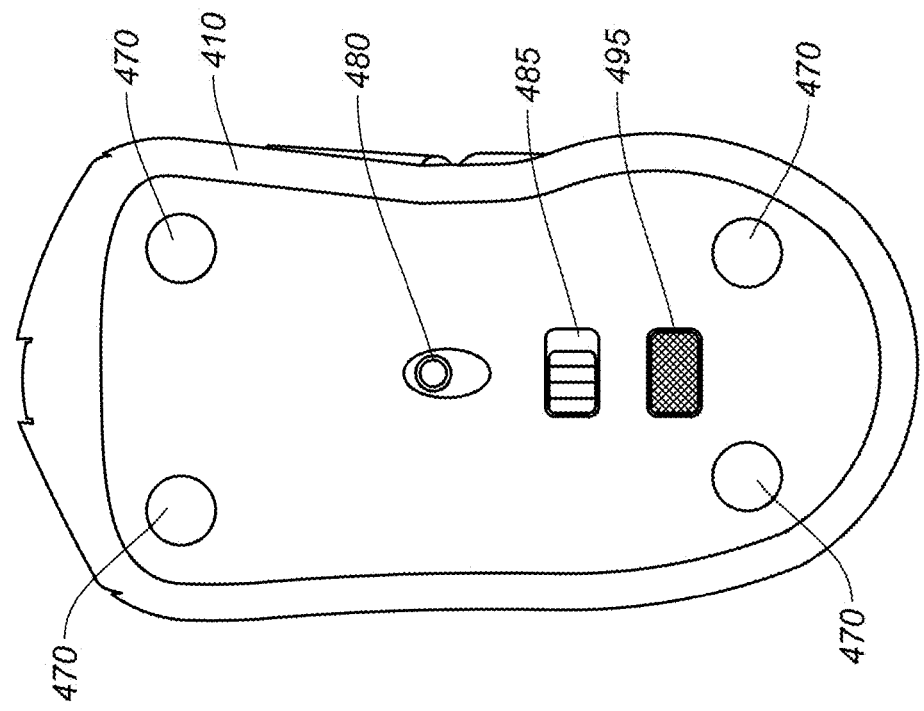
FIGS. 4A-4B show aspects of a computer mouse, according to certain embodiments.
Figure 4A:
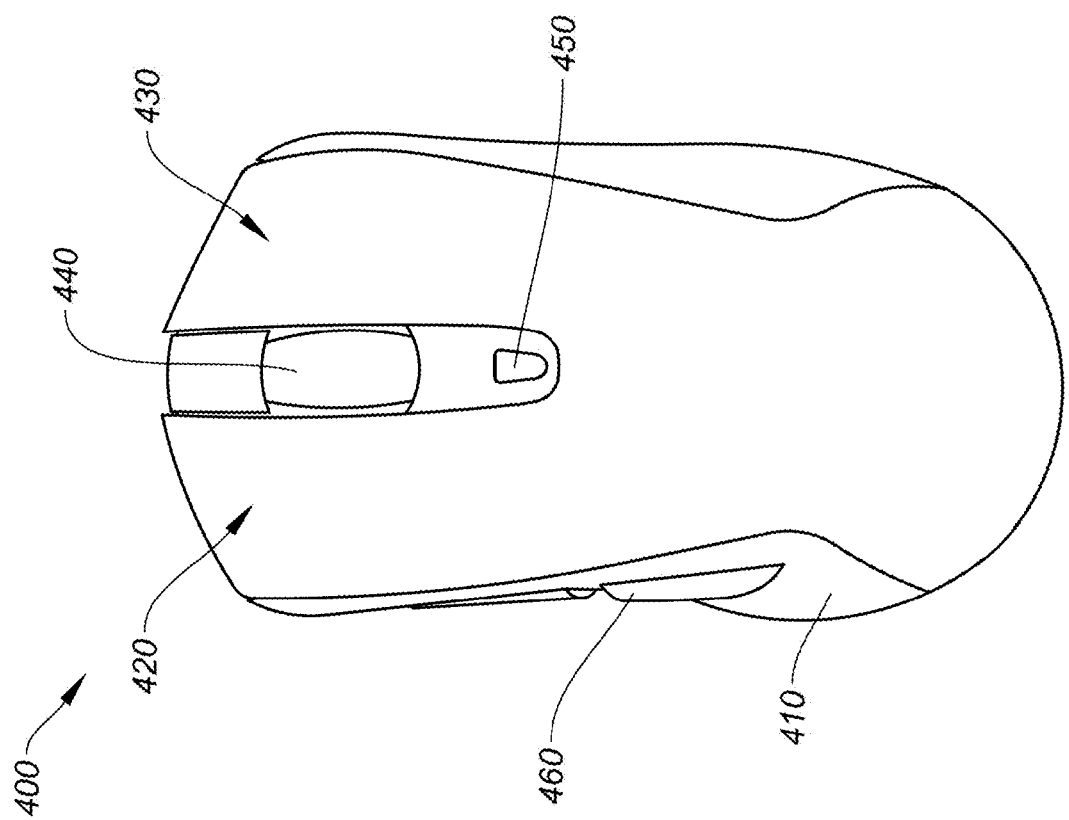

FIG. 4A shows aspects of a computer mouse 400, according to certain embodiments. Computer peripheral device 400 may be similar to input device 130 and can include housing 410 (e.g., the "shell," "chassis," or "body" of the computer peripheral device), left button 420, right button 430, scroll wheel 440 and buttons 450, 460, as well as any other suitable input elements (e.g., additional buttons, side scroll wheels, touch sensors, etc.) or output elements (e.g., light emitting diodes (LEDs), displays, haptic feedback elements, speakers, etc.), and the like. In some cases, button 450 may be a mode selection button to switch computer mouse 400 between one or more modes of operation with different performance characteristics, as would be understood by one of ordinary skill in the art.

In some embodiments, buttons 450, 460 may be configured to switch communication between host computing devices. For instance, some embodiments may have multi-host connectivity such that computer peripheral device 400 may communication with a first host computer (e.g., a PC laptop) and switch to a second host computer (e.g., a Mac computer) in response to a corresponding button press, as further described in patent application Ser. No. 14/884,381, which is incorporated by reference in its entirety for all purposes. Alternatively or additionally, switching between hosts may be achieved by, for example, moving a corresponding cursor to an edge of a display in a "flow" enabled system, as further described in patent application Ser. No. 15/226,770 which is incorporated by reference in its entirety for all purposes. Buttons 450, 460 or any other computer peripheral devices can be configured in any suitable manner and may utilize any suitable function, which can be preset or user programmed (e.g., via corresponding driver software on a host computing device), as would be understood by one of ordinary skill in the art.

FIG. 4B shows aspects of a bottom portion of computer peripheral device 400, according to certain embodiments. The bottom of computer peripheral device 400 can include one or more feet 470, an image sensor 480 (e.g., CMOS sensor using an IR LED lamp), and a power switch 485. Additional input elements (e.g., buttons, sliders, etc.) may be included. In some cases, power switch 485 may be located elsewhere on the mouse or may not be included at all (e.g., computer peripheral device 400 may power up/power down based on usage). Button 495 may be a mode selection switch (e.g., switch for selecting a first mode of operation or a second mode of operation), a multi-host computer selection button, or the like. In some embodiments, button 495 may be a communication protocol selection button. For example, pressing button 495 may switch between a proprietary high-frame rate communication protocol or a lower power lower frame rate communication protocol (e.g., Bluetooth® LE). One of ordinary skill in the art with the benefit of this disclosure would understand the many variations, modifications, and alternative embodiments thereof.

In preferred embodiments, image sensor 480 is typically located near the center of the bottom portion of computer peripheral device 400, as shown. Image sensor 480 can be a single sensor but can operate in one or multiple modes of operation (e.g., surface tracking, changing operating parameters to adapt to particular surface types and corresponding surface classifications, as further described below), according to certain embodiments. An image sensor can be a complementary metal-oxide semiconductor (CMOS) sensor that captures images of the underlying surface and sends each image to a processor (e.g., processor 210, on-board processing on the sensor, etc., to perform image correlation and displacement calculations, etc.) for analysis.

Other types of image sensors may be used, including charge-coupled devices (CCD), N-type metal-oxide-semiconductors (NMOS), hybrid devices (e.g., CCD/CMOS), or the like, as would be understood by one of ordinary skill in the art. The processor can detect patterns in the images and see how those patterns have moved since the previous image, and based on changes in the patterns over a sequence of images, the processor can determine how far and what direction the corresponding computer peripheral device has moved, which can be sent to the host computer to control one or more functions (e.g., control a cursor on a display, control an audio volume in a music application, etc.). This process can occur many hundreds if not thousands of times per second to accurately detect movement of all types including a range of movement speeds and accelerations. Note that the following embodiments describe a number of braking systems for a computer peripheral device, such as a computer mouse, and typically refer to computer mouse 400. It should be understood that any of the braking systems described herein can operate within computer mouse 400, or any computer peripheral device, and also that the application of the various braking systems are not limited to computer mouse 400 and may apply to other computer mice and other computer peripheral devices, as would be appreciated by one of ordinary skill in the art with the benefit of this disclosure.

Electro-permanent Magnets (EPM) and Aspects of Operation

Electro-permanent magnets present a number of advantages over more conventional systems in input devices that utilize permanent magnets and/or electromagnets. A permanent magnet can be an object made from a material that is magnetized and creates its own persistent magnetic field. Materials that can be magnetized, which are also the same materials that are strongly attracted to a magnet, are called ferromagnetic materials and typically include at least one of the elements iron, nickel and cobalt and their alloys, some alloys of rare-earth metals, and some naturally occurring minerals such as lodestone. Ferromagnetic materials can be comprised of magnetically "soft" materials like annealed iron, which can be magnetized but do not tend to stay magnetized, and magnetically "hard" materials, which tend to stay magnetized. Permanent magnets are made from "hard" ferromagnetic materials such as alnico (e.g., iron alloy typically comprised of aluminum, nickel, and cobalt, as well as copper and/or titanium) and ferrite (e.g., ceramic material comprised of iron (III) oxide (e.g., $Fe_2O_3$, rust) blended with barium, manganese, nickel, and/or zinc) that are subjected to processing in a strong magnetic field during manufacture to align their internal microcrystalline structure, making them very hard to demagnetize. In order to demagnetize a saturated magnet, a certain magnetic field must be applied, and this threshold depends on a coercivity of the respective material. "Hard" materials typically have high coercivity, whereas "soft" materials typically have low coercivity. The overall strength of a magnet is measured by its magnetic moment or, alternatively, the total magnetic flux it produces. For the purposes of this disclosure, this can be referred to as the magnetic field intensity. A significant drawback of using permanent magnets is that their application can be limited as one magnetic field intensity typically cannot be practicably increased or decreased to control, for instance, different levels of rotational friction on a scroll wheel or different feedback response profiles on a button or key.

An electromagnet is comprised of a coil of wire that operates as a magnet when an electric current passes through it but stops operating like a magnet when the current stops. Often, the coil is wrapped around a core of "soft" ferromagnetic material such as mild steel, which can substantially increase the magnetic field produced by the coil. As described above, although an electromagnet can generate a range of magnetic field intensities, an electromagnet requires continuous power to maintain the magnetic field, which can prohibit practical use in most battery powered input devices because of the high power consumption required and the likely significant corresponding reduction in battery life.

In an EPM circuit (also referred to herein as an "EPM core," "EPM system," or "EPM assembly"), once the magnet is magnetized (e.g., both polarity and magnetic intensity) by the EPM system via the coil, the power through the coil can be shut off and the magnet maintains its newly established magnetic field intensity without any additional power needed to maintain it. As such, any desired feedback profile can be achieved, thereby allowing multiple settings for certain features such as linearly adjustable input elements (e.g., buttons, keys, triggers, support structures, etc.), rotationally adjustable input elements (e.g., scroll wheels, knobs, gaming wheels and/or pedals, hinges, etc.), or the like. A magnetic field in an EPM assembly can be shut off in a similar manner, as well as different levels of magnetic intensity by varying the current pulse and amplitude, as would be appreciated by one of ordinary skill in the art with the benefit of this disclosure.

Figure 5A:
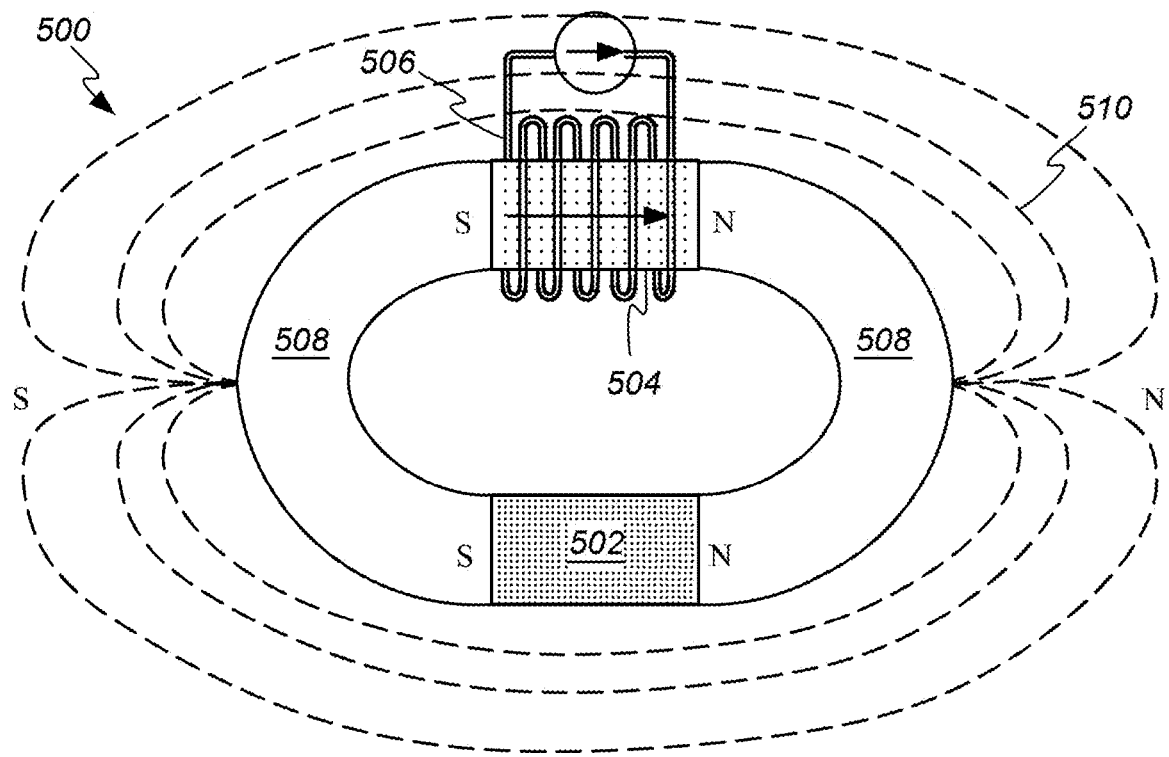
FIGS. 5A-5B show an example of a simplified representation of an electro-permanent magnet system, according to certain embodiments.
Figure 5B:
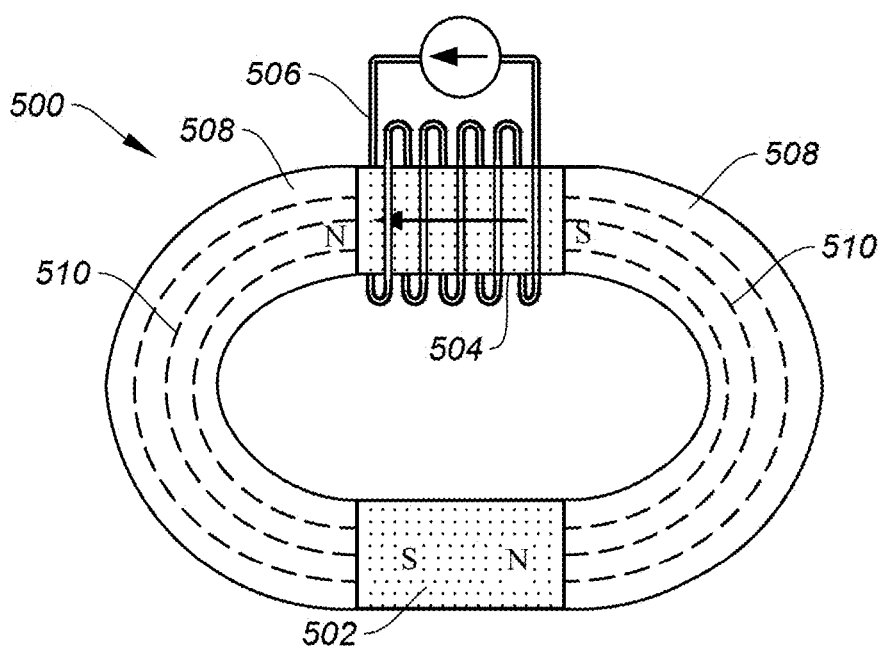

FIGS. 5A-5B show an example of a simplified electro-permanent magnet system 500 that utilizes two magnets rather than one as is used in many of the embodiments described herein, however the operational principles are the same as would be appreciated by one of ordinary skill in the art with the benefit of this disclosure. In the particular simplified embodiments of FIGS. 5 and 6, electro-permanent magnet 500 includes a first permanent magnet 502 and a second permanent magnet 504. First permanent magnet 502 can have a higher intrinsic coercivity than second permanent magnet 504. In some embodiments, as described above, permanent magnet 502 can take the form of a rare earth (e.g., Neodymium Iron Boron or Samarium Cobalt) magnet and second permanent magnet 504 can take the form of a ferromagnetic (e.g., Alnico or ferrite) magnet. The lower intrinsic coercivity of second permanent magnet 504 allows for a magnetizing coil 506 to emit a magnetic field of sufficient strength to reverse a polarity of the magnetic field emitted by second permanent magnet 504 without affecting the magnetization of first permanent magnet 502. For example, in some embodiments, an intrinsic coercivity of first permanent magnet 502 can be over ten times greater than an intrinsic coercivity of second permanent magnet 504. The lower intrinsic coercivity of second permanent magnet 504 also reduces the amount of electrical energy needed to flip the polarity of second permanent magnet 504, thereby allowing for more efficient operation of electro-permanent magnet 500. First permanent magnet 502 and second permanent magnet 504 are each positioned between and in direct contact or at least close contact with ferromagnetic poles 508. Ferromagnetic poles 508 can be formed from a ferritic material such as mild steel, having an even lower intrinsic coercivity than second permanent magnet 504. Ferromagnetic poles 508 helps guide the magnetic fields emitted by first permanent magnet 502 and second permanent magnet 504. In some embodiments a size and shape of ferromagnetic poles 508 can be adjusted to produce a magnetic field having a desired size and shape. It should be noted that other materials can be used for the EPM cores that are not expressly presented here, provided that said materials provide the same or similar operational characteristics described throughout the present disclosure. In some aspects, EPM cores can be comprised of NdFeB and CoCrC, the latter being the material that can have its magnetic field modulated by coil of the EPM core.

FIG. 5A shows dashed lines 508 depicting a magnetic flux emitted by electro-permanent magnet 500 that show how with both first and second permanent magnets 502 and 504 oriented in the same direction, magnetic flux is released from electro-permanent magnet 500 to create well defined north and south poles. This magnetic field is symmetrical, as depicted, when the strengths of the magnetic fields emitted by the two permanent magnets are about the same.

FIG. 5B shows how when the polarity of first permanent magnet 502 is opposite the polarity of second permanent magnet 504, the magnetic flux generated by both permanent magnets remains substantially contained within and circulating through ferromagnetic poles 508, first permanent magnet 502 and second permanent magnet 504. This results in electro-permanent magnet 500 emitting little to no magnetic field. These principles can be applied to the embodiments that follow utilizing a single magnet or multiple magnets in the EPM system.

As addressed above, aspects of the invention relate to a dynamic and contextual braking system configured to stop and prevent rotation of a scroll wheel under certain circumstances, such as braking when a user tries to rotate the scroll wheel in a first direction and releasing the brake when the user tries to rotate the scroll wheel in a second direction. Aspects of the invention may cause a contextual braking system to apply a braking action when a particular word (e.g., mobile) is depicted on the screen, such that a user can freely scroll through a document with peace of mind that the computer mouse will automatically halt a scrolling action at each instance the particular word, phrase, symbol, or any other sequence of text appears, and may further provide contextual braking in response to non-textual data such as video graphics, audio cues, or the like, that may occur. In another example, a list of selectable settings in a drop-down menu may have twenty selectable options. In some aspects, a computer mouse may operate the scroll wheel in a ratcheted mode of operation where a ratchet effect occurs as the user scrolls through each choice. The computer mouse may then apply a brake to stop movement of the scroll wheel when the user tries to scroll down beyond the twentieth selectable option and again when the user tries to scroll up past the first selectable option. In each example, rotation of the scroll wheel is allowed in one direction, but not the other. This functionality is made possible by a sensor system configured to momentarily detect a direction a user starts rotating the scroll wheel and subsequently apply the braking action if appropriate. Typically, the braking action is performed by a braking system that operates separately from the scroll wheel's force feedback system. For instance, a first system may be configured to provide a freewheel, ratchet, or resistance mode of operation for the scroll wheel as a rotational feedback for the user, which can be implemented with any suitable technology (e.g., electro-permanent magnet, electro-magnet, mechanical, or the like), and a second system may apply the braking action to stop the scroll wheel from rotating in a dynamic and contextual manner. However, some implementations may integrate both systems. The various embodiments described below and depicted in the accompanying figures provide a number of non-limiting implementations for braking systems that incorporate piezoelectric and/or EPM-based technology, however other system types are contemplated, as further described below, and as would be appreciated by one of ordinary skill in the art with the benefit of this disclosure.

FIGS. 6A-6C show a braking system 600 for applying contextual braking using a piezoelectric device, according to certain embodiments. Computer mouse 400 includes a scroll wheel braking system ("braking system") 600 that applies a braking force to a scroll wheel that can be contextually applied (e.g., applied in a first direction but not a second direction, applied in response to a control signal corresponding to a text, audio, or video-based cue, or the like), as described above. Braking system 600 includes a scroll wheel 610 with a groove 615, a feedback profile system 620, a brake shoe 630, a piezo device 640, a chassis 650. Piezo device 640 is coupled to the chassis at hinge 655. Chassis 650 can be any suitable part of the computer mouse 400 to provide an anchoring location for piezo device 640 and any other part of system 600. Braking system 600 may be configured adjacent to scroll wheel 610 in computer mouse 400 as shown in FIG. 6A, however, other configurations are possible as would be appreciated by one of ordinary skill in the art with the benefit of this disclosure.

Scroll wheel 610 can rotate a first direction (e.g., forward) and a second direction (e.g., backwards). In some cases, scroll wheel 610 may be configured to tilt or be depressed for additional functionality. Feedback profile system 620 can include any suitable system to provide one or more rotational feedback profiles such as a ratcheting rotational feedback, a constant force rotational feedback, a linear resistance rotational feedback, a freewheel rotational feedback, or the like. In typical embodiments, the feedback profile system is different than the braking system (as shown in the accompanying figures), however some embodiments may integrate them into a single system. Scroll wheel 610 may include a groove 615 to interface with brake shoe 630. Brake shoe 630 may be configured to apply a friction-based stopping force on any suitable location on scroll wheel including within or out of the groove, axially (as further described below), or on other locations, as would be appreciated by one of ordinary skill in the art with the benefit of this disclosure.

Brake shoe 630 can include one or more brake shoes, according to certain embodiments. Brake shoe 630 may be shaped concentrically relative to an axis of scroll wheel 610 so that when pressed against scroll wheel 610, a large surface area of brake shoe 630 contacts groove 615, however other shapes are possible. Brake shoe 630 may be comprised of suitable materials to preferably achieve efficient friction, low wear-and-tear, and low-noise operation. For example, the EPM wheel may be comprised of stainless steel and the EPM brake shoe may be comprised of fiberglass. In another example, the EPM wheel is stainless steel and the EPM brake shoe is polyurethane. In a further example, the EPM wheel is ABS plastic and the EPM brake shoe is polyurethane. One of ordinary skill in the art with the benefit of this disclosure would appreciate the many modifications, variations, and alternative embodiments thereof.

Piezo device 640 can include one or more piezoelectric elements coupled to chassis 650 at hinge 655 in a cantilevered configuration, according to certain embodiments. In operation, piezo device 640 is normally planar or substantially planar when unbiased with no voltage across it. In the unbiased state, piezo device 640 does not contact brake shoe 630, as shown in FIG. 6B. In some embodiments, piezo device 640 may be in contact with brake shoe 630 in an unbiased state but may not provide a sufficient force to move brake shoe 630 onto scroll wheel 620 to provide a frictional braking force. Piezo device 640 may bend in proportion to an applied biasing voltage, which can thereby contact and push brake shoe 630 onto scroll wheel 620 and provide a frictional braking force (at groove 615), as shown in FIG. 6C. Typically, piezo device 640 is coupled to chassis on one end (hinge 655) in a cantilevered configuration because as piezo device 640 bends in response to an applied voltage, the distance between each of piezo device 640 may shorten. The voltage biasing across piezo device 640 can be controlled by processor(s) 210 and/or by or in conjunction with any aspect of system 200 (e.g., power management system 230, output control 260, etc.). The amount of deflection for piezo device 640 may be proportional to the amount of applied biasing voltage. Typically, the greater deflection and corresponding biasing voltage, the greater the frictional braking force when brake shoe 630 is in contact with scroll wheel 620. Braking system 600 can be dynamically controlled with very fast response times for the application and removal of the frictional braking force due, in part, to the speed at which piezo device 640 responds to an application and removal of a biasing voltage.

Piezo devices can have different types of dimensions, operating voltages, different deflections at difference bias levels, and sometimes minimal latency. Piezo devices will typically be either a washer type (round shape), and a cantilever type (rectangular shape). The washer type is typically flat when no voltage is applied and bends to be convex or concave in response to a bias voltage, as shown in FIGS. 6B and 6C, respectively. A cantilever type is typically flat when no voltage is applied and bends under a biasing voltage. In co-axial mechanical implementations, as shown and further described below with respect to FIG. 10, the piezo brake is round (washer type) and configured to be pressed against the wheel side. The rotation axis (wheel shaft) lateral motion/free play (further described below) defines the piezo operating envelope. For example, if the free lateral motion/free play of the wheel axis is +/−0.1 mm then piezo deformation under the Vmax (maximum operating voltage) applied should be greater than 0.2 mm in order to deflect past the free play and apply force to the wheel side. Typically, the force vs. displacement relationship on every specific piezo should be considered, as would be appreciated by one of ordinary skill in the art with the benefit of this disclosure.

For cantilever-type architectures, the same consideration should be taken to define the operating envelope of the piezo transducer. That is, the free play should be subtracted from the piezo operating envelope (the full displacement (deformation) of the piezo goes beyond the free play range to apply the stopping force on the wheel). The advantage of the cantilever system is that the convex and concave deformation of the piezo transducer can have the opposite function (e.g., convex deformation applies braking and concave deformation allows free-wheeling), whereas in the washer-type transducer convex and concave correspond to braking and neutral positions for freewheeling. Typically, no bias is required for the washer-type piezo for freewheeling when the piezo transducer is flat, whereas for the cantilever transducer the bias corresponding of the full actuation voltage may be needed to release the wheel into the free-wheeling position.

With respect to latency, actuation time is about 1 ms for piezotransducers (both types) and typically relates to the transducer capacity, operating voltage, and the projected efficiency. For example, battery powered cordless input devices can use "slower" actuation in order to save the battery life, whereas the corded devices may use a faster actuation time for a snappy reaction to the user action (e.g., below 1 ms).

FIG. 7 shows an EPM-controlled braking system 700, according to certain embodiments. Braking system 700 can include scroll wheel 710, a feedback profile system 720, an EPM system 730, a cantilever-configured arm 740, and a brake shoe 760. EPM system 730 can include magnet system 735. Arm 740 can be hingeably and rotatably coupled to a chassis 750 on one end at hinge 755 and can include a magnet 745 on the other end. Magnet 745 may be configured to be adjacent to magnet system 735, as shown in FIG. 7. Braking system 700 may operate similar to braking system 600 in that a brake shoe is configured adjacent to a scroll wheel and, in response to an applied force, is moved to contact the scroll wheel and provide a frictional braking force. However, the applied force in FIG. 7 is provided by an arm 740 controlled by a magnetic field rather than a biased piezo device. More specifically, EPM system 730 can be magnetized to generate attracting or repelling magnetic fields between magnets 735 and 745 to apply and release the frictional braking force, respectively. The operation of an EPM system, including magnetization, demagnetization, and setting the strength of the magnetic fields of the magnets involved (e.g., by processor(s) 210) are described above with respect to FIGS. 5A-5B, as well as the applications incorporated by reference, as noted above.

In some embodiments, EPM system 730 may be configured such that no magnetic field or repelling magnetic fields are present between magnets 735, 745, which can cause arm 740 and corresponding brake shoe 760 coupled to arm 740 to move in a direction away from the scroll wheel, such that there is no contact between brake shoe 760 and scroll wheel 710. In some embodiments, EPM system 730 may be configured such that attracting magnetic fields are present between magnets 735, 745, which can cause arm 740 and corresponding brake shoe 760 coupled to arm 740 to move in a direction towards scroll wheel 710, causing contact and a corresponding frictional braking force, as described above. The amount of frictional force may be proportional to the strength of the attracting magnetic field between magnets 735, 745. The magnetic fields can be controlled dynamically and contextually in real-time, as described above, due in part to the ability of the EPM system to rapidly change a magnetic field strength between magnets 735, 745, which can depend on EPM inductance and a required magnetization current, and may be as fast as 300 μs and faster in some cases. Although an EPM-based system is shown in several embodiments depicted in the accompanying drawings, other magnetic-field controlling systems can be used, such as electromagnetic (EM)-based systems, although the power efficiency of EPM-based systems is markedly better than EM-based systems, and more thus EPM-based systems are better suited to wireless devices (e.g., battery powered devices).

Though the novel embodiments of FIGS. 6A-7 provide dynamic and/or contextual scroll wheel braking capabilities, additional functionality is needed to support directional braking. In other words, braking that is only applied when a user attempts to rotate the scroll wheel one direction, but not applied when the user attempts to rotate the scroll wheel in the opposite direction. By way of example, a list of selectable settings in a drop-down menu may have twenty selectable options. The computer mouse may apply a brake to stop movement of the scroll wheel in response to a control signal indicating when the user tries to scroll down beyond the twentieth selectable option and again when the user tries to scroll up past the first selectable option. In each example, rotation of the scroll wheel is allowed in one direction (i.e., scrolling through the list), but not the other (i.e., not scrolling past the first or last selectable option). More non-limiting examples include when the control signal is received from processors 210, a host computing device, or a host computing device via processors 210, and is associated with an interaction by the computer mouse with a software application operating on the host computing device, the control signal corresponding to at least one of a scrolling action in the software application, via the scroll wheel, that reaches a beginning or end of a selectable list of elements, settings, or options; a zooming action in the software application, via the scroll wheel, that reaches a lower or upper limit of a zoom range; a shuttling action in the software application, via the scroll wheel, that reaches a beginning or end of an audio file, a video file, a series of images; and a switching action in the software application, via the scroll wheel, that reaches a beginning or end of a series of selectable objects. Other functions can be controlled, including audio functions (e.g., volume, panning, frequency filtering, etc.), video functions (e.g., brightness, contrast, etc.), switching between selectable elements such as webpage tabs, gaming features (e.g., shifting between multiple states, borders, selectable accessories, etc.), and more. One of ordinary skill in the art with the benefit of this disclosure would appreciate the many modifications, variations, and alternative embodiments thereof. In some conventional systems, a braking system may be applied, but only universally and not in one direction. This functionality is made possible by a sensor system configured to detect a direction a user starts rotating the scroll wheel and subsequently apply the braking action if appropriate. In some embodiments, the direction can be sensed based on motion-detection system and/or a force detection system. FIG. 8A-FIG. 10 show examples of braking systems that utilize motion detection for directional braking. FIG. 11 shows an example of a braking system that utilizes force detection for directional braking. The following descriptions and corresponding figures that are described represent just some of the many ways of implementing a directional-braking system. One of ordinary skill in the art with the benefit of this disclosure would appreciate the many modifications, variations, and alternative embodiments thereof.

FIGS. 8A-8C show a smart braking system 800 for applying directional braking using motion detection via an engagement mechanism, according to certain embodiments. Smart braking system 800 can include a scroll wheel 810, arm 830, engagement mechanism 840, and chassis 850. Arm 830 can be hingeably and rotatably coupled to chassis 850 at hinge 855, similar to arm 740 of FIG. 7. Arm 300 may be manipulated to move engagement mechanism 840 to and from scroll wheel 810 via any suitable method, including via a piezo device (see, e.g., FIGS. 6A-6C), and EPM system (see, e.g., FIG. 7), and EM system, a motor, or other suitable system, as would be appreciated by one of ordinary skill in the art with the benefit of this disclosure.

Engagement mechanism 840 performs at least two functions including an ability to apply a braking force to stop a rotation of scroll wheel 810 in both directions, while also allowing a very small angle of rotation before applying the braking force to allow the sensor system to detect a motion (e.g., via a Hall sensor) to determine which direction user 805 is rotating the scroll wheel. This allows for a dynamic and real-time application and/or removal of a braking force to support directional braking. The engagement mechanism 840 of FIG. 8 is a roller device with one or more radial protrusions configured to provide a braking force. In operation, when arm 830 is moved such that engagement mechanism 840 contacts scroll wheel 810, as shown in FIG. 8B, engagement mechanism 840 may be configured such that the one or more radial protrusions are not contacting scroll wheel 810, allowing a limited rotation of scroll wheel 810 and enabling the sensor system to detect a motion (e.g., rotation) of scroll wheel 810 in both a first (e.g., backwards) and second (e.g., forwards) direction. When user 805 rotates scroll wheel 810 backwards in a first direction, as shown in FIG. 8A, engagement mechanism 840 contacts scroll wheel 810 and provides a braking force that stops the rotation of scroll wheel 810 in the first direction. Likewise, when user 805 rotates scroll wheel 810 forwards in a second direction, as shown in FIG. 8C, engagement mechanism 840 contacts scroll wheel 810 and provides a braking force that stops the rotation of scroll wheel 810 in the second direction.

In some cases, the EPM wheel maximum rotation speed can be limited by the user experience (UX) (no physical limitation) and user physical abilities. The amount of energy stored in the rotating wheel can be a half of the moment of inertia multiplied by the square of the rotational speed. The braking mechanism may have some snappiness when actuated, where the wheel may not be configured to stop immediately on the spot due to the limited friction force (although some embodiments may employ high frictional force to stop the wheel immediately as needed). Therefore, for the contextual scrolling case (e.g., scrolling a long menu or a text at a full speed), the stop position should be well anticipated by the SW/FW and the braking action can be gradually applied to stop at the given position.

In many of the embodiments described herein, the braking force is frictional. Some braking methods may employ magnetorheological (MR) fluid for braking. A non-exhaustive summary of braking methods that can be used in the various embodiments herein include:

TABLE I

SUMMARY OF BRAKING METHODS FOR USE IN EMBODIMENTS HEREIN

| Brake Type | Freewheel | Brake force | React time | Power Use | Wear/Tear | Cost |
|---|---|---|---|---|---|---|
| EPM Mag | + | Low to Med | Fast | Low (pulse) | None | Medium |
| EM magnetic | + | Low to Med | Fast | High | None | Low |
| EPM friction | + | High | Fast | Low (pulse) | Low to Med (brake pad) | Medium |
| EM friction | + | High | Fast | High | Low to Med (brake pad) | Low |
| Piezo friction | + | Med to High | Med to Fast (capacitive) | Medium | Med to High (fragile) | High |
| ES friction | + | Med to High | Med to Low | Med to High | Med to High (dielectric failure) | High |
| MR fluid | − | High | Medium | Med to High | Low to Med (aging) | Medium | system, as would be appreciated by one of ordinary skill in the art with the benefit of this disclosure.

In some aspects, the one or more protrusions can be comprised of any suitable materials to provide an adequate braking force, but issues like friction force, wear and tear between the wheel and brake pad should be considered. Some typical materials for the wheel rim can include Stainless steel, ABS plastic, and polyurethane. One of ordinary skill in the art with the benefit of this disclosure would appreciate the many modifications, variations, and alternative embodiments thereof.

As applied to an example previously presented, a drop-down menu may be accessed that allows a user to scroll between twenty selections. Directional braking can allow the user to scroll between the selections and cause the scroll wheel to stop or resist rotation when the user tries to scroll up past the first selection or down past the twentieth selection. For instance, when user 805 accesses the menu, the tenth selection may be highlighted. The host computing device (e.g., processor(s) 302) may send a control signal to computer mouse 400 (e.g., processor(s) 210 of system 200) indicating that rotation is allowed in either direction. In such case, braking system 800 may move or keep arm 830 away from scroll wheel 810 so that engagement mechanism 840 is not in contact therewith, and scroll wheel 810 can freely rotate under any suitable feedback profile (e.g., ratcheting, free wheel, etc.). When the control signal indicates that user 805 has scrolled upwards (e.g., in the first direction) to the first selection, the braking system may move arm 840 towards scroll wheel 810 (e.g., via piezo, EPM, EM, etc., as shown in FIGS. 6A-6C) such that engagement mechanism 840 is in contact with scroll wheel 810, as shown in FIG. 8B, which can occur imperceptibly fast from a user perspective. For example, EPM actuation (e.g., from freewheeling to full brake) may take a few hundred microseconds, and piezo actuation (from freewheeling to full brake) may be 1 ms or faster. For the piezo transducer the transition can be made slower, but the snappiness may be wanted for certain modes of operation (e.g., ratchet mode). Referring back to FIG. 8B, if user 805 proceeds to rotate scroll wheel further in the first direction within the limited angle of rotation (e.g., attempting to scroll up past the first selection), the sensor system can detect continued movement in the first direction and keep engagement mechanism 840 coupled to scroll wheel 810, which will provide a braking force when the protrusion makes contact with the scroll wheel, as shown in FIG. 8A). In contrast, if user 805 rather proceeded to rotate scroll wheel in the second direction (e.g., forward) within the limited angle of rotation (e.g., moving from the first selection down towards the last selection), the sensor system can detect said movement in the second direction and move arm 830 and corresponding engagement mechanism 840 away from scroll wheel 810, so that no braking force is applied and user 805 can continue to rotate scroll wheel 810 on that direction.

In a similar manner, when the control signal indicates that user 805 has scrolled downwards (e.g., in the second direction) to the last selection (e.g., twentieth selection), the braking system may move arm 840 towards scroll wheel 810 such that engagement mechanism 840 is in contact with scroll wheel 810, as shown in FIG. 8B. If user 805 then proceeds to rotate scroll wheel further in the second direction within the limited angle of rotation (e.g., attempting to scroll down past the last selection), the sensor system can detect continued movement in the second direction and keep engagement mechanism 840 coupled to scroll wheel 810, which will provide a braking force when the protrusion makes contact with the scroll wheel, as shown in FIG. 8C). In contrast, if user 805 rather proceeded to rotate scroll wheel in the first direction (e.g., backwards towards the first selection) within the limited angle of rotation (e.g., moving from the first selection down towards the second selection), the sensor system can detect said movement in the first direction and move arm 830 and corresponding engagement mechanism 840 away from scroll wheel 810, so that no braking force is applied and user 805 can continue to rotate scroll wheel 810 in that direction. In some cases, the braking system may not apply a braking force or move arm 830 to the positions of FIGS. 8A-8C when user 805 is accessing (e.g., highlighting) any of the second through second-to-last selections. The example of FIGS. 8A-8C is but one implementation and any desired rules or applications can be applied when determining how to apply the smart braking (e.g., directional braking) systems described herein. One of ordinary skill in the art with the benefit of this disclosure would appreciate the many modifications, variations, and alternative embodiments thereof.

In some embodiments, and by way of example, if a wheel includes 24 teeth per 360 degrees (one wheel revolution), there may be 15 degrees per ratchet notch in a symmetrical embodiment. The reactivity of the braking system should be sufficient to actuate the brake mechanism and stop the wheel within a desired sector (e.g., 15 degrees around the ratchet notch center position). That is, the sector angular size together with the wheel angular velocity can define the maximum delay from the angular sensing to the brake actuation including the stopping distance (note that the braking force can be limited). Thus, in this case, the maximum permissible delay may be a function of the number of teeth per revolution, the maximum angular velocity, and the maximum angular acceleration of the wheel. For an anticipated rotation, the maximum angular acceleration can define how early the brake control should be applied in order to stop the wheel on time within the desired sector.

The engagement mechanism shown in FIGS. 8A-8C are but one of many different types of engagement mechanisms that facilitate a small angle of rotation of the scroll wheel so that a sensor system can detect movement and dynamically apply or remove the braking force on the scroll wheel. For example, FIG. 9A shows another type of engagement mechanism, according to certain embodiments. Brake shoe 940 is coupled to an arm 930 in a manner that allows a limited translational movement of brake shoe 940 before a braking force is applied. Arm 930 can be hingeably and rotatably coupled to chassis 950 at hinge 955, similar to the examples described above. In operation, arm 930 may be moved up such that brake shoe 940 is in contact with a scroll wheel (not shown), as shown and described above with respect to FIG. 7. When the user rotates the scroll wheel while brake shoe 940 is in contact with the scroll wheel, brake shoe 940 may slide along a path (e.g., on a linear path, curved path, etc.) by a limited distance before reaching an end point and stopping, thereby providing a braking force on the scroll wheel. This limited translational movement allows the sensor system to detect a movement of the scroll wheel so that a directional braking can be implemented, as described above. In some aspects, the distance should be sufficient to reliably detect the motion by the hall sensor (e.g., shaft angular sensor). That is, in some cases, there is a certain sensitivity of the sensor, including the dead reckoning threshold. The sensitivity can be defined by the number of pulses per rotation (hence the minimum sensible angle increment), by the absolute angular sensing of the Hall sensor detecting the variation of the magnetic flux density, or the like, One of ordinary skill in the art with the benefit of this disclosure would appreciate the many modifications, variations, and alternative embodiments thereof. The value of the distance (linear play/offset converted to the angle)

should be beyond the detection threshold plus the worst operating conditions (e.g., noise, gain, dead reckoning angle, etc).

FIG. 9B shows another type of engagement mechanism, according to certain embodiments. Brake shoe 940 is coupled to an arm 930 similar to way brake shoe 740 is coupled to arm 730 in FIG. 7. Arm 930 can be hingeably and rotatably coupled to chassis 950 at hinge 955, similar to the examples described above, however hinge 955 is configured to allow a limited translational movement inside of housing 960, as shown in FIG. 9B. In operation, arm 930 may be moved up such that brake shoe 940 is in contact with a scroll wheel (not shown), as shown and described above with respect to FIG. 7. When the user rotates the scroll wheel while brake shoe 940 is in contact with the scroll wheel, arm 930 may slide along a path (e.g., on a linear path) within housing 960 by a limited distance before reaching an end point and stopping, thereby allowing brake shoe 940 to provide a braking force on the scroll wheel. This limited translational movement allows the sensor system to detect a movement of the scroll wheel so that a directional braking can be implemented, as described above.

For a non-limiting example, the shaft's immediate angular position can be measured by an optical encoder with the resolution of Res=256 pulses per revolution. Hence, there can be 2(π/256) radians per pulse. The outer wheel diameter can be D=0.02 m. The brake can be applied to the outer part of the rim (defined by D). The shoe play should not be smaller than one full pulse sector, which can be translated to the linear motion as Shoe_freeplay_distance>π*D/Res=π*0.02 m/256=0.25 mm.

Figure 10A:
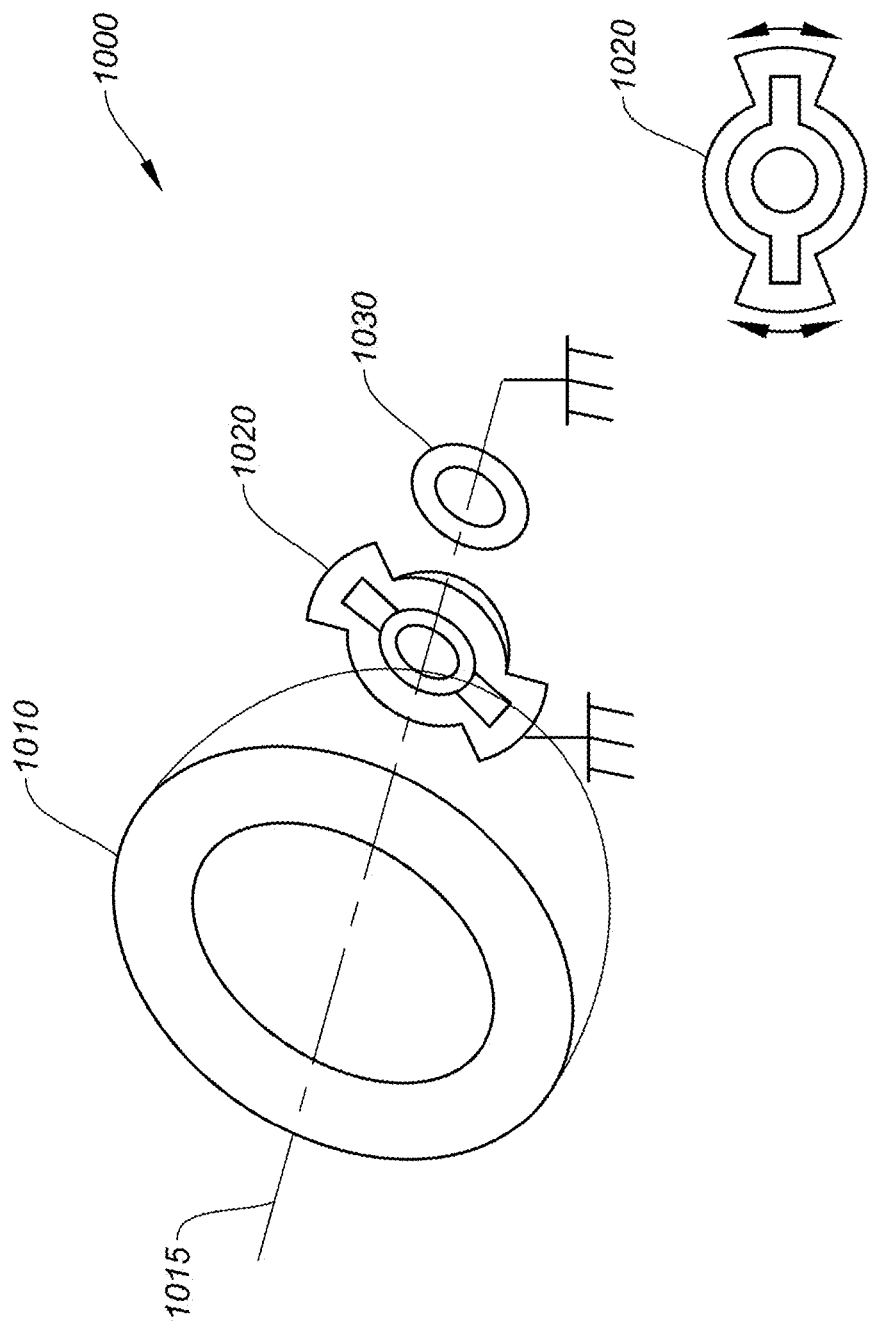
FIG. 10A shows a further type of engagement mechanism, according to certain embodiments.
Figure 11:
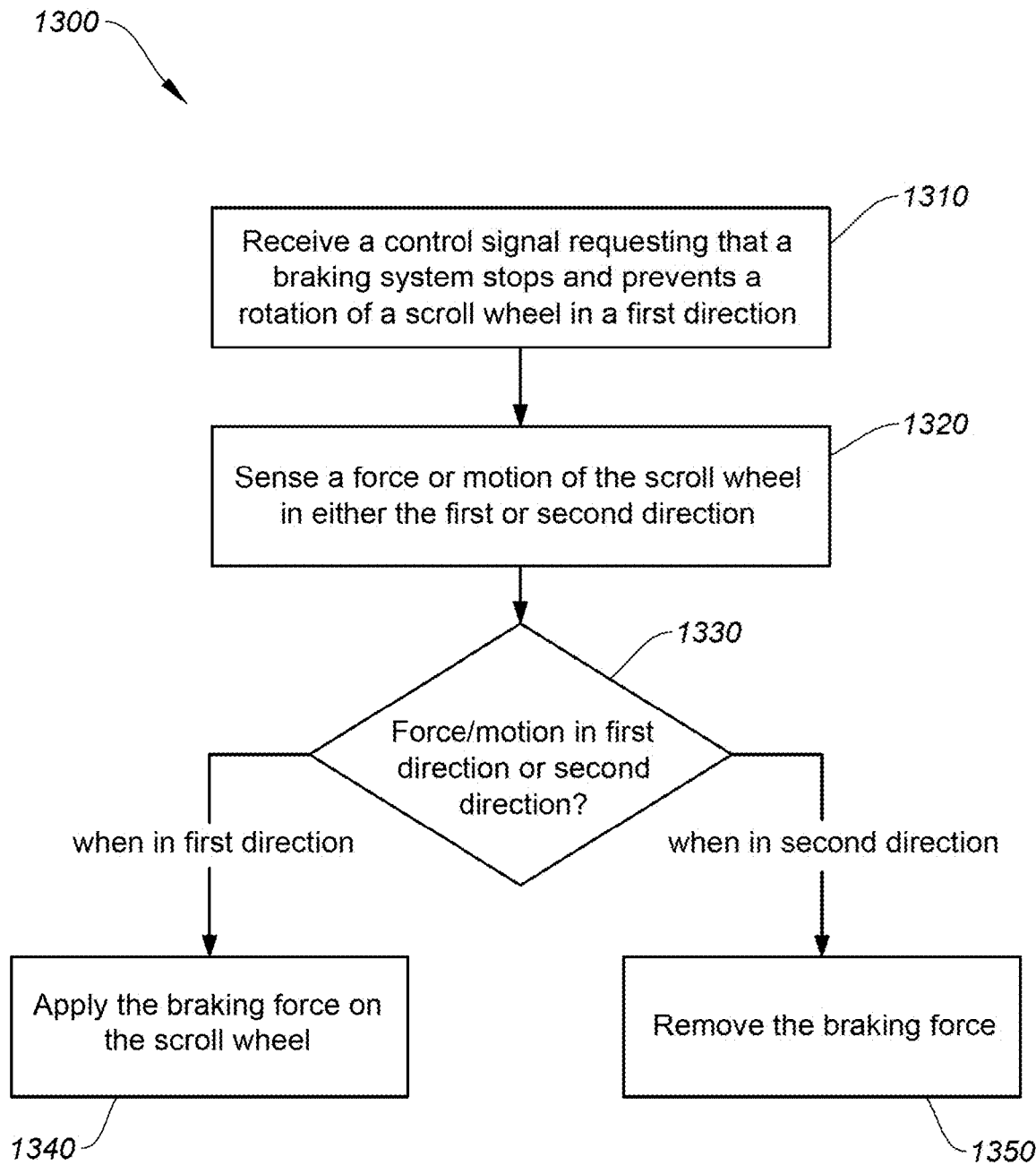
FIG. 11 is a simplified flow chart showing aspects of a method for operating a smart braking system, according to certain embodiments.

FIG. 10A shows a further type of engagement mechanism, according to certain embodiments. A scroll wheel 1010 rotates on an axis of rotation 1015. An engagement mechanism 1020 is configured to be pushed into and out of a position along the axis of rotation 1015 via piezo device 1030. When piezo device 1030 bends in response to a biasing voltage (e.g., as described above with respect to FIGS. 6A-6C), engagement mechanism 1020 engages with scroll wheel 1010 in a manner that allows a limited rotational movement before one or more protrusions of engagement mechanism 1020 contacts a portion of scroll wheel that prevents further rotation (a braking force). This limited rotational movement allows the sensor system to detect a movement of the scroll wheel so that a directional braking can be implemented, as described above. Piezo device 1030 may be configured in a conical configuration, as shown, in a linear configuration, or any suitable configuration that can move engagement mechanism to and from a contacting position with scroll wheel 1010.

Figure 10B:
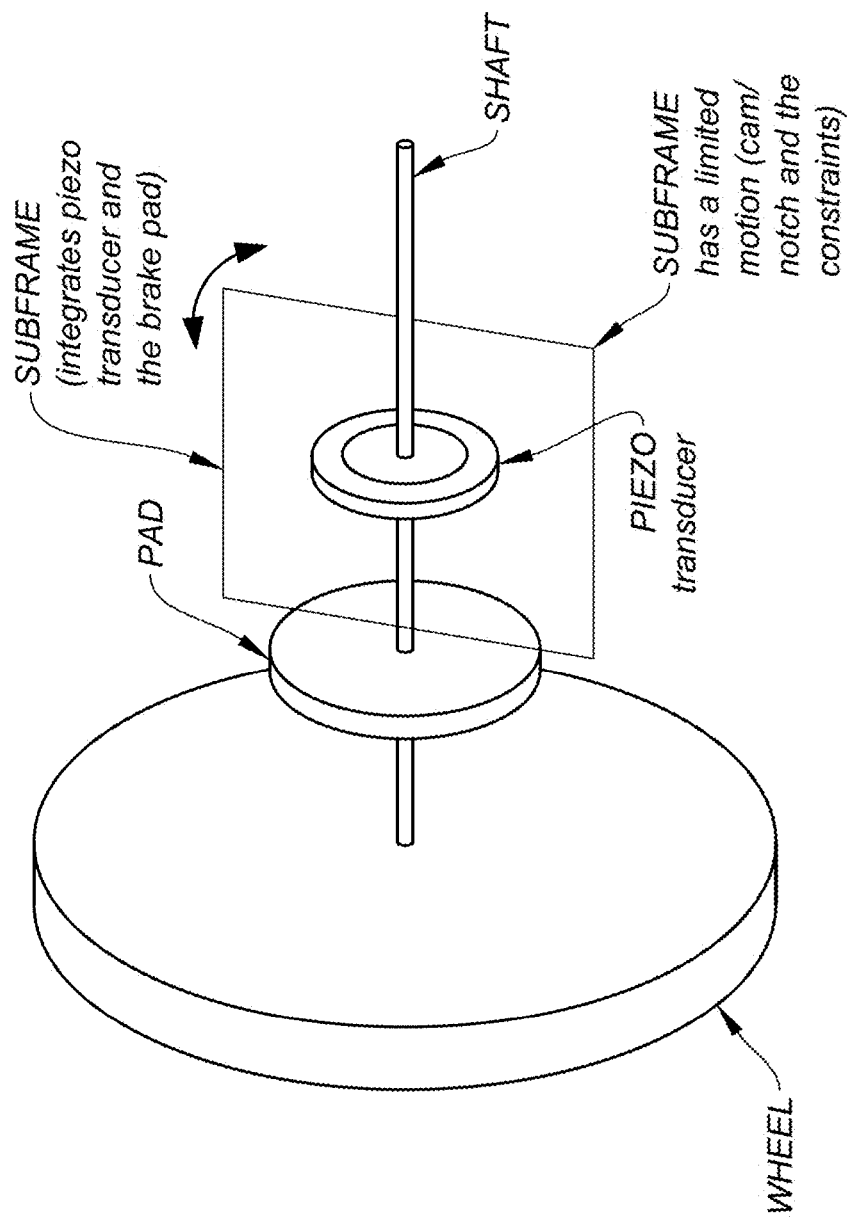
FIG. 10B shows a further type of engagement mechanism, according to certain embodiments.

FIG. 10B shows another type of engagement mechanism, according to certain embodiments. In contrast to FIG. 10A, instead of fixing the piezo transducer on the wheel cage, the piezo transducer and the pad can be fixed to the subframe which has a limited mobility against the wheel cage. The amount of the mobility should match the requirement about the minimum angular rotation detectable by the rotation sensor.

In some exemplary embodiments, a computer mouse may comprise: one or more processors; a scroll wheel operable to rotate on an axis in a first and second direction; a braking system controlled by the one or more processors and operable to provide a braking force on the scroll wheel that stops and prevents rotation of the scroll wheel; a sensor system operable to detect a force or motion of the scroll wheel in the first and second directions, wherein in response to receiving a control signal to stop rotation of the scroll wheel in the first direction, the one or more processors cause the braking system to: apply the braking force on the scroll wheel when the sensor indicates that the force or motion of the scroll wheel is in the first direction; and remove the braking force when the sensor indicates that the force or motion of the scroll wheel is in the second direction, and wherein in response to receiving a control signal to stop rotation of the scroll wheel in the second direction, the one or more processors cause the braking system to: apply the braking force on the scroll wheel when the sensor indicates that the force or motion of the scroll wheel is in the second direction; and remove the braking force when the sensor indicates that the force or motion of the scroll wheel is in the first direction. In some embodiments, a feedback profile system may be configured to cause the scroll wheel to rotate according to a plurality of modes of operation including any of a ratcheting rotational feedback, a constant force rotational feedback, a linear resistance rotational feedback, a freewheel rotational feedback, or the like, where the feedback profile system is a different system than the braking system.

In some implementations, the braking system may include an engagement mechanism (e.g., as shown in FIGS. 8A-10) and a piezoelectric device controlled by the one or more processors and coupled to the engagement mechanism, wherein in response to an applied voltage, the piezoelectric device bends and pushes the engagement mechanism from a first position, where the engagement mechanism does not interface with the scroll wheel, to a second position where the engagement mechanism interfaces with the scroll wheel and provides the braking force (e.g., as shown in FIGS. 8A-8C). In some implementations, the piezoelectric device and the engagement mechanism are configured on an axis of the scroll wheel, wherein the engagement mechanism coaxially interfaces with the scroll wheel when in the second position (e.g., as shown in FIG. 10). In some aspects, the engagement mechanism includes one or more radial protrusions that provide the braking force, and the engagement mechanism allows a limited rotation of the scroll wheel before the radial protrusion provides the braking force, wherein the limited rotation enables the sensor system to detect the force or motion of the scroll wheel in the first and second directions (e.g., as shown in FIGS. 8A-8C). In some embodiments, the computer mouse further comprises a chassis, where the engagement mechanism comprises: a cantilevered arm fixedly and rotatably coupled to the chassis, the cantilevered arm positioned radially adjacent along a portion of a user-actuated outer portion of the scroll wheel and a braking element coupled to the cantilevered arm and configured to interface with the outer portion of the scroll wheel and provide the braking force when the engagement mechanism is in the second position, where the braking element allows a limited movement of the scroll wheel before it applies the braking force, and the limited movement enables the sensor system to detect the force or motion of the scroll wheel in the first and second directions. Examples of this type of engagement mechanism are shown in FIG. 9A. In some embodiments, the braking element has a round portion with at least one radially protruding wing, where the round portion of the braking element interfaces with outer portion of the scroll wheel, where the round portion allows the limited movement as a rotation of the braking element when the engagement mechanism is in the second position and the radially protruding wing is not in contact with the outer portion of the scroll wheel, and wherein the braking element provides the braking force when the radially protruding wings is in contact with the outer portion of the scroll wheel (as shown in FIGS. 8A-8C). In further embodiments, the braking element can be a brake shoe coupled to the cantilevered arm and configured to interface with the outer portion of the scroll wheel when the engagement mechanism is in the second position, where the brake shoe allows a limited translational movement between the brake shoe and the cantilevered arm when the engagement mechanism is in the second position before applying the braking force, as shown in FIG. 9A. In some aspects, the braking element is a brake shoe coupled to the cantilevered arm and configured to interface with the outer portion of the scroll wheel when the engagement mechanism is in the second position, where the cantilevered arm is fixedly and rotatably coupled to the chassis at a coupling point (e.g., in a housing) in a manner that allows a limited translational movement between the cantilevered arm and the chassis at the coupling point before the brake shoe applies the braking force, as shown in FIG. 9B.

In many of the previous example, movement is detected via motion detection (e.g., via a Hall sensor) to detect a small rotation of the scroll wheel before a directional braking force is applied. Some embodiments may employ other methods of detecting movement. For instance, force detection may be used to determine a direction that the user intends to rotate the scroll wheel without requiring actual movement of the scroll wheel. Force detection can be performed by a force sensor, such as a force sensitive resistor (FSR), strain gauge, or the like. In some embodiments, an FSR or strain gauge can be configured between piezo device 640 and brake shoe 630 in FIG. 6, between brake shoe 740 and arm 730 in FIG. 7, or any other suitable location (e.g., between hinge 955 and housing 960, etc.) where a force imparted on the scroll wheel to implement rotation in the first or second direction would be detectable by the force sensor, strain gauge, or the like, as would be appreciated by one of ordinary skill in the art with the benefit of this disclosure.

Thus, some exemplary embodiments described above can be modified such that the engagement mechanism comprises a cantilevered arm fixedly and rotatably coupled to the chassis, the cantilevered arm positioned radially adjacent along a portion of a user-actuated outer portion of the scroll wheel; a braking element coupled to the cantilevered arm and configured to interface with the outer portion of the scroll wheel and provide the braking force when the engagement mechanism is in the second position, wherein the sensor system further comprises a force or strain sensor configured between the cantilevered arm and the braking element and operable to detect the force or motion of the scroll wheel in the first and second directions.

In some embodiments, the braking system includes an engagement mechanism and an EPM-based system controlled by the one or more processors via a controller current, the EPM-based system coupled to the engagement mechanism, where in response to a controller current (e.g., a control signal), the EPM-based system magnetically moves the engagement mechanism from a first position where the engagement mechanism does not interface with the scroll wheel to a second position where the engagement mechanism interfaces with the scroll wheel and provides the braking force.

It should be noted that many of the embodiments described herein describe activation of a piezo device or EPM system to move an engagement mechanism from a first position where it is not contact the scroll wheel or portion thereof, to a second position where it is contacting the scroll wheel or portion thereof. It should be understood that each embodiments can move back from the second position to the first position by either the system that moves the engagement mechanism from the first to second position (e.g., piezo device, EPM, EM, etc.) and/or in conjunction with another system to return the engagement system back to the first position (e.g., biasing mechanism such as a spring), as would be appreciated by one of ordinary skill in the art with the benefit of this disclosure. Also, some embodiments show the engagement mechanism interfacing the scroll wheel axially (e.g., as shown in FIGS. 10A and 10B) or radially (e.g., as shown in FIGS. 8A-9B), however some embodiments may be configured within scroll wheel and may include an engagement mechanism that provides a braking force by interfacing with features outside of the scroll wheel, such as the chassis or other features, as would be appreciated by one of ordinary skill in the art with the benefit of this disclosure. In some embodiments, there may be some latency (e.g., <10 ms) for synchronizing a position of the scroll wheel and a position of a control icon (e.g., cursor) on a graphical user interface (GUI). As such, dynamic changes to smart braking can appear to be seamless and near instantaneous from a user perspective, though some systems may have a small amount of latency in synchronizing activity performed by the scroll wheel and shown on the GUI, as would be appreciated by one of ordinary skill in the art with the benefit of this disclosure.

FIG. 11 is a simplified flow chart showing aspects of a method 1100 for operating a smart braking system, according to certain embodiments. Method 1100 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, method 1100 can be performed by aspects of system 200 (e.g., processor (s) 210, input detection 250, output control 260), system 300 (e.g., processor(s) 302), or a combination thereof.

At operation 1110, method 1100 can include receiving, by one or more processors of the computer mouse, a control signal requesting that a braking system stop and prevent a rotation of a scroll wheel in a first direction, the scroll wheel normally operable to rotate in the first direction and a second direction, according to certain embodiments.

At operation 1120, method 1100 can include sensing, by a sensor system, a force or motion of the scroll of the scroll wheel in either the first or second direction, according to certain embodiments.

When the sensor indicates that a force or motion of the scroll wheel is in the first direction (operation 1130), method 1100 can include applying the braking force on the scroll wheel (operation 1140). When the sensor indicates that a force or motion of the scroll wheel is in the second direction (operation 1130), method 1100 can include removing the braking force on the scroll wheel (operation 1150).

It should be appreciated that the specific steps illustrated in FIG. 11 provide a particular method 1100 for operating a smart braking system, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer mouse comprising:
   one or more processors;
   a scroll wheel operable to rotate on an axis in a first and second direction;
   a braking system controlled by the one or more processors and operable to provide a braking force on the scroll wheel that stops and prevents rotation of the scroll wheel; and
   a sensor system operable to detect a force or motion of the scroll wheel in the first and second directions,
   wherein in response to receiving a control signal to stop rotation of the scroll wheel in the first direction, the one or more processors cause the braking system to:
      apply the braking force on the scroll wheel when the sensor system indicates that the force or motion of the scroll wheel is in the first direction; and
      remove the braking force when the sensor system indicates that the force or motion of the scroll wheel is in the second direction,
   wherein in response to receiving a control signal to stop rotation of the scroll wheel in the second direction, the one or more processors cause the braking system to:
      apply the braking force on the scroll wheel when the sensor system indicates that the force or motion of the scroll wheel is in the second direction; and
      remove the braking force when the sensor system indicates that the force or motion of the scroll wheel is in the first direction.

2. The computer mouse of claim 1 wherein the braking system includes:
   an engagement mechanism; and
   a piezoelectric device controlled by the one or more processors and coupled to the engagement mechanism,
   wherein in response to an applied voltage, the piezoelectric device bends and pushes the engagement mechanism from a first position, where the engagement mechanism does not interface with the scroll wheel, to a second position where the engagement mechanism interfaces with the scroll wheel and provides the braking force.

3. The computer mouse of claim 2 wherein the piezoelectric device and the engagement mechanism are configured on an axis of the scroll wheel,
   wherein the engagement mechanism coaxially interfaces with the scroll wheel when in the second position.

4. The computer mouse of claim 3 wherein the engagement mechanism includes one or more radial protrusions that provide the braking force, and
   wherein the engagement mechanism allows a limited rotation of the scroll wheel before the radial protrusion provides the braking force, and
   wherein the limited rotation enables the sensor system to detect the force or motion of the scroll wheel in the first and second directions.

5. The computer mouse of claim 2 wherein the computer mouse further comprises a chassis, and where the engagement mechanism comprises:
   a cantilevered arm fixedly and rotatably coupled to the chassis, the cantilevered arm positioned radially adjacent along a portion of a user-actuated outer portion of the scroll wheel; and
   a braking element coupled to the cantilevered arm and configured to interface with the outer portion of the scroll wheel and provide the braking force when the engagement mechanism is in the second position,
   wherein the braking element allows a limited movement of the scroll wheel before it applies the braking force, and
   wherein the limited movement enables the sensor system to detect the force or motion of the scroll wheel in the first and second directions.

6. The computer mouse of claim 5 wherein the braking element has a round portion with at least one radially protruding wing,
   wherein the round portion of the braking element interfaces with outer portion of the scroll wheel,
   wherein the round portion allows the limited movement as a rotation of the braking element when the engagement mechanism is in the second position and the radially protruding wing is not in contact with the outer portion of the scroll wheel, and
   wherein braking element provides the braking force when the radially protruding wings is in contact with the outer portion of the scroll wheel.

7. The computer mouse of claim 5 wherein the braking element is a brake shoe coupled to the cantilevered arm and configured to interface with the outer portion of the scroll wheel when the engagement mechanism is in the second position,
   wherein the brake shoe allows a limited translational movement between the brake shoe and the cantilevered arm when the engagement mechanism is in the second position before applying the braking force.

8. The computer mouse of claim 5 wherein the braking element is a brake shoe coupled to the cantilevered arm and configured to interface with the outer portion of the scroll wheel when the engagement mechanism is in the second position, wherein the cantilevered arm is fixedly and rotatably coupled to the chassis at a coupling point in a manner that allows a limited translational movement between the cantilevered arm and the chassis at the coupling point before the brake shoe applies the braking force.

9. The computer mouse of claim 2 wherein the computer mouse further comprises a chassis, and wherein the engagement mechanism comprises:
 a cantilevered arm fixedly and rotatably coupled to the chassis, the cantilevered arm positioned radially adjacent along a portion of a user-actuated outer portion of the scroll wheel;
 a braking element coupled to the cantilevered arm and configured to interface with the outer portion of the scroll wheel and provide the braking force when the engagement mechanism is in the second position,
 wherein the sensor system further comprises a force or strain sensor configured between the cantilevered arm and the braking element and operable to detect the force or motion of the scroll wheel in the first and second directions.

10. The computer mouse of claim 1 wherein the braking system includes:
 an engagement mechanism; and
 an electropermanent magnet (EPM)-based system controlled by the one or more processors via a controller current, the EPM-based system coupled to the engagement mechanism,
 wherein in response to a controller current, the EPM-based system magnetically moves the engagement mechanism from a first position where the engagement mechanism does not interface with the scroll wheel to a second position where the engagement mechanism interfaces with the scroll wheel and provides the braking force.

11. The computer mouse of claim 10 wherein the computer mouse further comprises a chassis, and where the engagement mechanism comprises:
 a cantilevered arm fixedly and rotatably coupled to the chassis, the cantilevered arm positioned radially adjacent along a portion of a user-actuated outer portion of the scroll wheel; and
 a braking element coupled to the cantilevered arm and configured to interface with the outer portion of the scroll wheel and provide the braking force when the engagement mechanism is in the second position,
 wherein the braking element allows a limited movement of the scroll wheel before it applies the braking force, and
 wherein the limited movement enables the sensor system to detect the force or motion of the scroll wheel in the first and second directions.

12. The computer mouse of claim 11 wherein the braking element has a round portion with at least one radially protruding wing,
 wherein the round portion of the braking element interfaces with outer portion of the scroll wheel,
 wherein the round portion allows the limited movement as a rotation of the braking element when the engagement mechanism is in the second position and the radially protruding wing is not in contact with the outer portion of the scroll wheel, and
 wherein braking element provides the braking force when the radially protruding wings contacts the outer portion of the scroll wheel.

13. The computer mouse of claim 11 wherein the braking element is a brake shoe coupled to the cantilevered arm and configured to interface with the outer portion of the scroll wheel when the engagement mechanism is in the second position,
 wherein the brake shoe allows a limited translational movement between the brake shoe and the cantilevered arm when the engagement mechanism is in the second position before applying the braking force.

14. The computer mouse of claim 1 wherein the control signal is received from a host computing device and is associated with an interaction by the computer mouse with a software application operating on the host computing device, the control signal corresponding to at least one of:
 a scrolling action in the software application, via the scroll wheel, that reaches a beginning or end of a selectable list of elements, settings, or options;
 a zooming action in the software application, via the scroll wheel, that reaches a lower or upper limit of a zoom range;
 a shuttling action in the software application, via the scroll wheel, that reaches a beginning or end of an audio file, a video file, a series of images; and
 a switching action in the software application, via the scroll wheel, that reaches a beginning or end of a series of selectable objects.

15. A method of operating a computer mouse, the method comprising:
 receiving, by one or more processors, a control signal requesting that a braking system stop and prevent a rotation of a scroll wheel in a first direction, the scroll wheel normally operable to rotate in the first direction and a second direction;
 sensing, by a sensor system, a force or motion of the scroll of the scroll wheel in either the first or second direction;
 when the sensor system indicates that a force or motion of the scroll wheel is in the first direction:
 applying the braking force on the scroll wheel; and
 removing the braking force when the sensor system indicates that the force or motion of the scroll wheel is in the second direction.

16. The method of claim 15 wherein the braking system includes:
 an engagement mechanism; and
 a piezoelectric device controlled by the one or more processors and coupled to the engagement mechanism, wherein the method further comprises:
 applying a voltage to the piezoelectric device causing it to bend and thereby push the engagement mechanism from a first position, wherein the engagement mechanism does not interface with the scroll wheel, to a second position, wherein the engagement mechanism interfaces with the scroll wheel and provides the braking force.

17. The method of claim 16 wherein the piezoelectric device and the engagement mechanism are configured on an axis of the scroll wheel,
 wherein the engagement mechanism coaxially interfaces with the scroll wheel when in the second position.

18. The method of claim 17 wherein the engagement mechanism includes one or more radial protrusions that provide the braking force, and
 wherein the engagement mechanism allows a limited rotation of the scroll wheel before the radial protrusion provides the braking force, and
 wherein the limited rotation enables the sensor system to detect the force or motion of the scroll wheel in the first and second directions.

19. The method of claim 16 wherein the computer mouse further comprises a chassis, and where the engagement mechanism comprises:
- a cantilevered arm fixedly and rotatably coupled to the chassis, the cantilevered arm positioned radially adjacent along a portion of a user-actuated outer portion of the scroll wheel; and
- a braking element coupled to the cantilevered arm and configured to interface with the outer portion of the scroll wheel and provide the braking force when the engagement mechanism is in the second position,
- wherein the braking element allows a limited movement of the scroll wheel before it applies the braking force, and
- wherein the limited movement enables the sensor system to detect the force or motion of the scroll wheel in the first and second directions.

20. The method of claim 19 wherein the braking element has a round portion with at least one radially protruding wing,
- wherein the round portion of the braking element interfaces with outer portion of the scroll wheel,
- wherein the round portion allows the limited movement of the braking element as a rotation when the engagement mechanism is in the second position and the radially protruding wing is not in contact with the outer portion of the scroll wheel, and
- wherein braking element provides the braking force when the radially protruding wings is in contact the outer portion of the scroll wheel.

21. The method of claim 19 wherein the braking element is a brake shoe coupled to the cantilevered arm and configured to interface with the outer portion of the scroll wheel when the engagement mechanism is in the second position,
- wherein the brake shoe allows a limited translational movement between the brake shoe and the cantilevered arm when the engagement mechanism is in the second position before applying the braking force.

22. The method of claim 15 wherein the control signal is received from a host computing device and is associated with an interaction by the computer mouse with a software application operating on the host computing device, the control signal corresponding to at least one of:
- a scrolling action in the software application, via the scroll wheel, that reaches a beginning or end of a selectable list of elements, settings, or options;
- a zooming action in the software application, via the scroll wheel, that reaches a lower or upper limit of a zoom range;
- a shuttling action in the software application, via the scroll wheel, that reaches a beginning or end of an audio file, a video file, a series of images; and
- a switching action in the software application, via the scroll wheel, that reaches a beginning or end of a series of selectable objects.

* * * * *